(12) United States Patent
Honda

(10) Patent No.: US 7,630,375 B2
(45) Date of Patent: Dec. 8, 2009

(54) DATA TRANSFER CONTROL DEVICE AND ELECTRONIC INSTRUMENT HAVING REDUCED POWER CONSUMPTION

(75) Inventor: Hiroyasu Honda, Chino (JP)

(73) Assignee: Seiko Epson Corporation (JP)

( * ) Notice: Subject to any disclaimer, the term of this patent is extended or adjusted under 35 U.S.C. 154(b) by 723 days.

(21) Appl. No.: 11/063,048

(22) Filed: Feb. 22, 2005

(65) Prior Publication Data

US 2005/0201157 A1    Sep. 15, 2005

(30) Foreign Application Priority Data

Mar. 9, 2004  (JP) .............................. 2004-066065

(51) Int. Cl.
H04L 12/28 (2006.01)

(52) U.S. Cl. ...................... 370/393; 370/473

(58) Field of Classification Search .................. None
See application file for complete search history.

(56) References Cited

U.S. PATENT DOCUMENTS

| | | | | |
|---|---|---|---|---|
| 4,675,863 A | * | 6/1987 | Paneth et al. ................ | 370/334 |
| 4,675,868 A | * | 6/1987 | Shishikura et al. .......... | 714/760 |
| 5,522,076 A | * | 5/1996 | Dewa et al. .................. | 713/2 |
| 6,628,563 B1 | * | 9/2003 | Hsu et al. ................. | 365/230.03 |
| 6,711,178 B1 | * | 3/2004 | O'Gorman et al. .......... | 370/473 |
| 7,111,108 B2 | * | 9/2006 | Grundy et al. ............... | 711/100 |
| 7,177,975 B2 | * | 2/2007 | Toombs et al. .............. | 711/103 |
| 7,188,162 B1 | * | 3/2007 | Fredriksson et al. ........ | 709/221 |
| 2002/0011998 A1 | * | 1/2002 | Tamura ....................... | 345/204 |
| 2003/0101239 A1 | * | 5/2003 | Ishizaki ....................... | 709/219 |
| 2006/0095756 A1 | * | 5/2006 | Erforth et al. ................ | 713/2 |

FOREIGN PATENT DOCUMENTS

| | | |
|---|---|---|
| JP | A-09-062613 | 8/1995 |
| JP | A-09-093552 | 9/1995 |
| JP | A-09-298578 | 5/1996 |
| JP | A-11-298555 | 4/1998 |
| JP | A-2000-148663 | 11/1998 |
| JP | A-2003-006145 | 6/2001 |
| JP | 2001-222249 | 8/2001 |

OTHER PUBLICATIONS

John Heinlein, Coherent Block Data Transfer in the FLASH Multiprocessor, Apr. 1, 1997 , IEEE, Proceedings 11th International Parallel Processing Symposium, pp. 18-27.*

SAE Standards, Serial Data Communication Interface, Jul. 2008, SAE, J2610, 1-2.*

* cited by examiner

*Primary Examiner*—Kizou Hassan
*Assistant Examiner*—Hooman Houshmand
(74) *Attorney, Agent, or Firm*—Harness, Dickey & Pierce, P.L.C.

(57) ABSTRACT

A data transfer control device includes a link controller which analyzes a packet received from a host-side data transfer control device through a serial bus, and an interface circuit which generates an interface signal and outputs the generated interface signal to an interface bus. When the address automatic update mode in an address automatic update field of a packet received from the host-side data transfer control device is set to ON, the interface circuit sequentially outputs signals of automatically updated addresses and signals of L-bit-data from among K bits of data set in the packet, the L-bit-data making a pair with each of the automatically updated addresses, while performing address automatic update processing M times (K=L×(M+1)) using an address set in the packet as a start address.

20 Claims, 17 Drawing Sheets

FIG. 7A

| Bit | 7 | 6 | 5 | 4 | 3 | 2 | 1 | 0 |
|---|---|---|---|---|---|---|---|---|
| | RESPONSE REQUEST | PACKET TYPE | | | LABEL | | | |
| | RETRY | ADDRESS SIZE | | | — | | | |
| | DATA LENGTH 0 ||||||||
| | DATA LENGTH 1 ||||||||
| | ADDRESS/COMMAND ||||||||
| | CONTINUOUS | ADDRESS AUTO-MATIC UPDATE | NUMBER OF UPDATES ||||||
| | | | PORT NUMBER ||||||
| | DATA/PARAMETER ||||||||
| | CRC0 ||||||||
| | CRC1 ||||||||

FIG. 7B

| Bit | 7 | 6 | 5 | 4 | 3 | 2 | 1 | 0 |
|---|---|---|---|---|---|---|---|---|
| | | PACKET TYPE | | | LABEL | | | |
| | — ||| — |||||
| | DATA LENGTH 0 ||||||||
| | DATA LENGTH 1 ||||||||
| | ADDRESS/COMMAND ||||||||
| | SYNCHRONIZATION SIGNAL CODE || PORT NUMBER ||||||
| | DATA/PARAMETER ||||||||
| | CRC0 ||||||||
| | CRC1 ||||||||

FIG. 8

| PORT NUMBER | PORT |
|---|---|
| 00 | DISABLES ALL PORTS |
| 01 | PARALLEL PORT (RGB/MPU) OF LCD1 |
| 02 | SERIAL PORT OF LCD1 |
| 03 | PARALLEL PORT (MPU) OF LCD2 |
| 04 | SERIAL PORT OF LCD2 |
| 05 | PARALLEL PORT OF LCD3 |
| 06 | SERIAL PORT OF LCD3 |
| ⋮ | ⋮ |
| 10 | GENERAL PORT 1 |
| 11 | GENERAL PORT 2 |
| 12 | GENERAL PORT 3 |
| ⋮ | ⋮ |
| 3F | PORT OF INTERNAL REGISTER |

FIG. 10A

| WRITE PORT COMMAND REGISTER | WRITE PORT PARAMETER REGISTER |
|---|---|
| READ PORT PARAMETER REGISTER | FIFO STATUS REGISTER |
| REGISTER TRANSFER START REGISTER | REGISTER TRANSFER START POINTER REGISTER |
| REGISTER TRANSFER END POINTER REGISTER | — |

FIG. 10B

| FPDRDY POLARITY | RGB I/F DATA BUS WIDTH | VIDEO INVERSION | DISPLAY BLANK | FPSHIFT POLARITY | RGB I/F CONTROL SIGNAL ENABLE | RGB I/F DATA TRANSFER ENABLE | INTERFACE SELECTION |
|---|---|---|---|---|---|---|---|

FIG. 10C

| REGISTER BIT VALUE | MODE | LCD1 INTERFACE | LCD2 INTERFACE |
|---|---|---|---|
| 00 | 1 | RGB INTERFACE | MPU INTERFACE |
| 01 | 2 | RGB INTERFACE | SERIAL INTERFACE |
| 10 | 3 | MPU INTERFACE | MPU INTERFACE |
| 11 | 4 | MPU INTERFACE | SERIAL INTERFACE |

FIG. 11A    LCD1 SETTING REGISTER
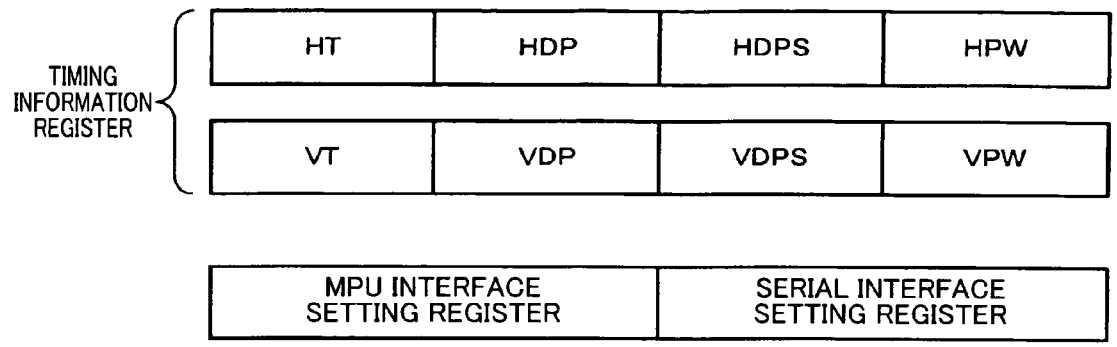
FIG. 11B    LCD2 SETTING REGISTER
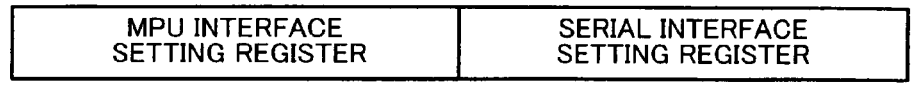
FIG. 11C    MPU INTERFACE SETTING REGISTER
SERIAL INTERFACE SETTING REGISTER
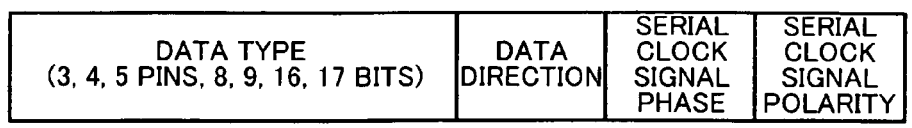

DATA TRANSFER CONTROL DEVICE AND ELECTRONIC INSTRUMENT HAVING REDUCED POWER CONSUMPTION

Japanese Patent Application No. 2004-66065, filed on Mar. 9, 2004, is hereby incorporated by reference in its entirety.

BACKGROUND OF THE INVENTION

The present invention relates to a data transfer control device and an electronic instrument.

In recent years, a high-speed serial transfer interface such as low voltage differential signaling (LVDS) has attracted attention as an interface aiming at reducing EMI noise or the like. In such a high-speed serial transfer interface, data transfer is realized by causing a transmitter circuit to transmit serialized data using differential signals and a receiver circuit to differentially amplify the differential signals (Japanese Patent Application Laid-open No. 2001-222249). The Digital Visual Interface (DVI) or the like has been known as an interface for such a high-speed serial transfer.

An ordinary portable telephone includes a first instrument section provided with buttons for inputting a telephone number or a character, a second instrument section provided with a main liquid crystal display (LCD), a sub LCD, or a camera, and a connection section such as a hinge which connects the first and second instrument sections. In this case, the number of interconnects passing through the connection section can be reduced by performing data transfer between a first substrate provided in the first instrument section and a second substrate provided in the second instrument section by serial transfer using differential signals.

However, when performing data transfer through such a connection section by serial transfer, it is desirable to reduce power consumption of a host-side data transfer control device and a target-side data transfer control device which control the serial transfer. It is also desirable to reduce the amount of data transferred through the serial bus. Furthermore, it is desirable to reduce the processing load imposed on a system device (CPU, display controller, or the like) which accesses the host-side data transfer control device and performs various settings.

BRIEF SUMMARY OF THE INVENTION

A first aspect of the present invention relates to a data transfer control device which controls data transfer, the data transfer control device including:

a link controller which analyzes a packet received from a host-side data transfer control device through a serial bus; and an interface circuit which generates an interface signal and outputs the generated interface signal to an interface bus, wherein a packet transferred from the host-side data transfer control device through the serial bus includes an address automatic update field for setting ON/OFF of an address automatic update mode, an address field for setting an address, and a data field for setting data, and wherein, when the address automatic update mode in the address automatic update field of a packet received from the host-side data transfer control device is set to ON, the interface circuit sequentially outputs signals of automatically updated addresses and signals of L-bit-data from among K bits of data set in the packet, the L-bit-data making a pair with each of the automatically updated addresses, while performing address automatic update processing M times ($K=L \times (M+1)$; K, L, and M are integers of two or more) using an address set in the packet as a start address.

A second aspect of the present invention relates to a data transfer control device which controls data transfer, the data transfer control device including:

an interface circuit which performs interface processing between the data transfer control device and a system device;

a link controller which generates a packet transmitted to a target-side data transfer control device through a serial bus; and an internal register accessed by the system device through the interface circuit, wherein a packet transferred to the target-side data transfer control device through the serial bus includes an address automatic update field for setting ON/OFF of an address automatic update mode, an address field for setting an address, and a data field for setting data, wherein at least a start address and K bits of data are set in the internal register by the system device, and wherein, when the link controller has judged that a transfer mode is the address automatic update mode, the link controller generates a packet in which the address automatic update mode in the address automatic update field is set to ON, the start address is set in the address field, and the K bits of data are set in the data field, and transmits the generated packet to the target-side data transfer control device.

A third aspect of the present invention relates to an electronic instrument including:

the above target-side data transfer control device;

a host-side data transfer control device connected with the target-side data transfer control device through the serial bus; and one or more devices connected with the target-side data transfer control device through the interface bus.

A fourth aspect of the present invention relates to an electronic instrument including:

the above host-side data transfer control device;

a target-side data transfer control device connected with the host-side data transfer control device through the serial bus; and one or more devices connected with the target-side data transfer control device through the interface bus.

BRIEF DESCRIPTION OF THE SEVERAL VIEWS OF THE DRAWING

FIGS. 7A and 7B are format examples of packets.

FIG. 8 is illustrative of a port number.

FIGS. 10A, 10B, and 10C are configuration examples of a port access register and the like.

FIGS. 11A, 11B, and 11C are configuration examples of an LCD1 setting register and the like.

DETAILED DESCRIPTION OF THE EMBODIMENT

Figure 1:
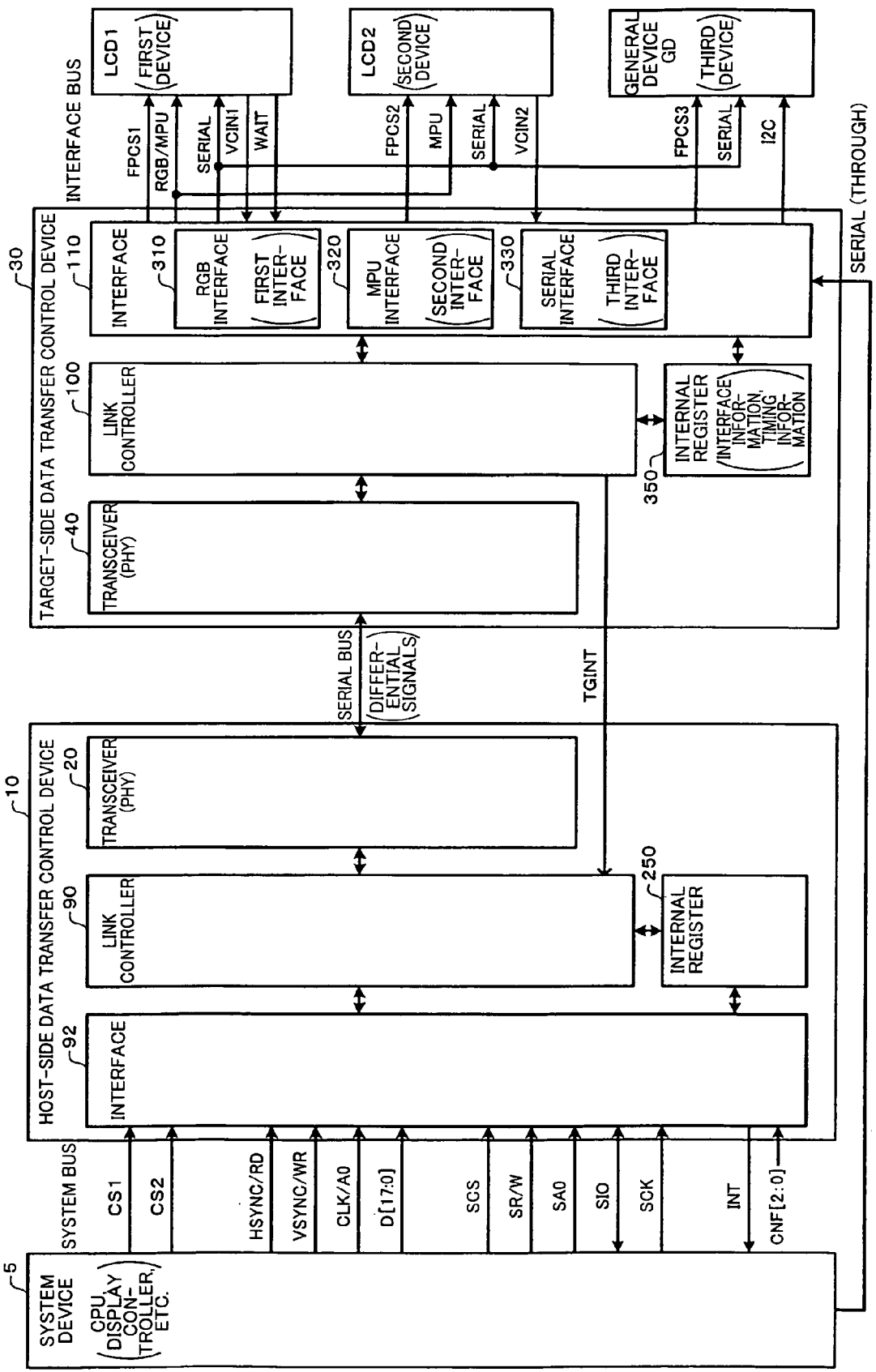
FIG. 1 is a configuration example of host-side and target-side data transfer control devices.

The present invention has been achieved in view of the above-described technical problem, and may provide a data transfer control device which can efficiently generate an interface signal, and an electronic instrument including the same.

One embodiment of the present invention provides a data transfer control device which controls data transfer, the data transfer control device including:

a link controller which analyzes a packet received from a host-side data transfer control device through a serial bus; and an interface circuit which generates an interface signal and outputs the generated interface signal to an interface bus, wherein a packet transferred from the host-side data transfer control device through the serial bus includes an address automatic update field for setting ON/OFF of an address automatic update mode, an address field for setting an address, and a data field for setting data, and wherein, when the address automatic update mode in the address automatic update field of a packet received from the host-side data transfer control device is set to ON, the interface circuit sequentially outputs signals of automatically updated addresses and signals of L-bit-data from among K bits of data set in the packet, the L-bit-data making a pair with each of the automatically updated addresses, while performing address automatic update processing M times ($K=L\times(M+1)$; K, L, and M are integers of two or more) using an address set in the packet as a start address.

According to this embodiment, a packet transferred from the host-side data transfer control device through the serial bus includes the address automatic update field for setting ON/OFF of the address automatic update mode. When the address automatic update mode in the address automatic update field is set to ON, the interface circuit automatically updates an address, and sequentially outputs signals of automatically updated addresses and signals of data which makes pairs with the addresses. This enables an interface signal including an address signal and a data signal to be efficiently generated. Moreover, since it is unnecessary to set all the addresses which make pairs with the data in the address field of a packet, efficiency of data transfer can be improved.

With this data transfer control device, the packet transferred from the host-side data transfer control device through the serial bus may include a number-of-updates field in which number-of-address-updates information is set, and the interface circuit may perform address update processing a number of times set by the number-of-updates information set in the packet.

This enables the interface circuit to determine the number of address updates without performing a calculation using the data length or the like, the processing load can be reduced. The number-of-updates information may be information equivalent to the number of updates.

With this data transfer control device, the packet transferred from the host-side data transfer control device through the serial bus may include a port number field for setting a port number, and the interface circuit may sequentially output signals of automatically updated addresses and signals of data which makes pairs with the automatically updated addresses to a port selected from among ports of one or more devices connected to the interface bus and a port of an internal register of the data transfer control device, based on the port number set in the packet as a destination.

This enables signals of automatically updated addresses and signals of data which makes pairs with the addresses to be output to various ports of one or more devices connected to the interface bus as the destination.

This data transfer control device may include an internal register in which interface information for specifying a signal type of an interface signal output from the interface circuit is set, and the interface circuit may output signals of automatically updated addresses and signals of data which makes pairs with the automatically updated addresses as interface signals in a signal type according to the interface information set in the internal register.

This enables interface signals of various signal types to be generated based on the interface information. Therefore, a data transfer control device which can flexibly deal with various interfaces of devices connected thereto can be provided.

With this data transfer control device, the interface information may be set in the internal register based on a packet transferred from the host-side data transfer control device through the serial bus.

This enables the interface information which specifies the signal type of the interface signal in detail to be efficiently received from the host-side data transfer control device through the serial bus.

With this data transfer control device, a packet in which data is set in a data field may be transferred from the host-side data transfer control device through the serial bus after the interface information has been set in the internal register, and the interface circuit may output signals of automatically updated addresses and signals of data included in the data set in the packet as interface signals in a signal type according to the interface information set in the internal register.

According to this feature, the interface information is transferred before performing data transfer, and a packet in which data is set in the data field is then transferred. Therefore, the amount of transfer data can be reduced when transferring a packet in which data is set in the data field, whereby efficiency of data transfer through the serial bus can be improved.

Another embodiment of the present invention provides a data transfer control device which controls data transfer, the data transfer control device including:

an interface circuit which performs interface processing between the data transfer control device and a system device;

a link controller which generates a packet transmitted to a target-side data transfer control device through a serial bus; and an internal register accessed by the system device through the interface circuit, wherein a packet transferred to the target-side data transfer control device through the serial bus includes an address automatic update field for setting ON/OFF of an address automatic update mode, an address field for setting an address, and a data field for setting data, wherein at least a start address and K bits of data are set in the internal register by the system device, and wherein, when the link controller has judged that a transfer mode is the address automatic update mode, the link controller generates a packet in which the address automatic update mode in the address automatic update field is set to ON, the start address is set in the address field, and the K bits of data are set in the data field, and transmits the generated packet to the target-side data transfer control device.

According to this embodiment, a packet transferred to the target-side data transfer control device through the serial bus includes the address automatic update field for setting ON/OFF of the address automatic update mode. The target can automatically update an address by setting the address automatic update mode in the address automatic update field to ON, whereby an interface signal can be efficiently generated. According to this embodiment, since it suffices that the system device to merely set the start address without setting all the addresses in the internal register, the processing load imposed on the system device can be reduced.

With this data transfer control device, the packet transferred to the target-side data transfer control device through the serial bus may include a number-of-updates field in which number-of-address-updates information is set, and when the link controller has judged that the transfer mode is the address automatic update mode, the link controller may generate a packet in which the address automatic update mode in the address automatic update field is set to ON, the number-of-updates information is set in the number-of-updates field, the start address is set in the address field, and the K bits of data are set in the data field, and may transmit the generated packet to the target-side data transfer control device.

This enables the target to determine the number of address updates without performing a calculation using the data length or the like, the processing load imposed on the target can be reduced.

With this data transfer control device, interface information for specifying a signal type of an interface signal output from an interface circuit of the target-side data transfer control device may be set in the internal register by the system device, and the link controller may generate a packet including the interface information set in the internal register, and may transmit the generated packet to the target-side data transfer control device through the serial bus.

This enables the target-side interface circuit to generate an interface signal of the signal type according to the transmitted interface information, whereby a data transfer control device which can flexibly deal with various interfaces of devices connected thereto can be provided.

With this data transfer control device, the internal register may include a register transfer start register, and the link controller may generate a packet including the interface information set in the internal register when the system device has directed start of transfer using the register transfer start register, and may transmit the generated packet to the target-side data transfer control device through the serial bus.

According to this feature, the interface information set in the host-side internal register is automatically transmitted to the target through the serial bus merely by causing the system device to direct start of transfer using the register transfer start register. This enables the processing load imposed on the system device to be reduced.

With this data transfer control device, the link controller may generate a packet in which data is set in a data field and may transmit the generated packet to the target-side data transfer control device through the serial bus after transmitting a packet including the interface information to the target-side data transfer control device.

According to this feature, the interface information is transferred before performing data transfer, and a packet in which data is set in the data field is then transferred. Therefore, the amount of transfer data can be reduced when transferring a packet in which data is set in the data field, whereby efficiency of data transfer through the serial bus can be improved.

A further embodiment of the present invention provides an electronic instrument including:

the above target-side data transfer control device;

a host-side data transfer control device connected with the target-side data transfer control device through the serial bus; and one or more devices connected with the target-side data transfer control device through the interface bus.

A still further embodiment of the present invention provides an electronic instrument including:

the above host-side data transfer control device;

a target-side data transfer control device connected with the host-side data transfer control device through the serial bus; and one or more devices connected with the target-side data transfer control device through the interface bus.

Embodiments of the present invention are described below in detail. Note that the embodiments described hereunder do not in any way limit the scope of the invention defined by the claims laid out herein. Note also that not all of the elements of these embodiments should be taken as essential requirements to the means of the present invention.

1. Configuration Example of Data Transfer Control Device

FIG. 1 shows a configuration example of host-side and target-side data transfer control devices 10 and 30. In this embodiment, a bridge function between a system bus and an interface bus is realized by using the host-side and target-side data transfer control devices 10 and 30. The data transfer control devices 10 and 30 are not limited to the configurations shown in FIG. 1. Some of the circuit blocks shown in FIG. 1 may be omitted, or the connection configuration between the circuit blocks may be changed, or a circuit block differing from those shown in FIG. 1 may be added. For example, a transceiver 20 may be omitted in the host-side data transfer control device 10, or a transceiver 40 may be omitted in the target-side data transfer control device 30.

The host (TX) side data transfer control device 10 and the target (RX) side data transfer control device 30 perform packet transfer through a serial bus using differential signals. In more detail, the data transfer control devices 10 and 30 transmit and receive packets by current-driving (or voltage-driving) differential signal lines of the serial bus.

The host-side data transfer control device 10 includes an interface circuit 92 which performs interface processing between the data transfer control device 10 and a system device 5 such as a CPU or a display controller. The system bus which connects the system device 5 with the interface circuit 92 includes signal lines for chip select signals CS1 and CS2. The system bus includes signal lines for signals HSYNC/RD, VSYNC/WR, CLK/A0, and D[17:0]. These signal lines are used as an RGB interface bus or a micro processor unit (MPU) interface bus.

In the case of using these signal lines as the RGB interface bus, the signals HSYNC/RD, VSYNC/WR, CLK/A0, and D[17:0] are respectively used as a horizontal synchronization signal, a vertical synchronization signal, a clock signal, and a data signal. The signals D[5:0], D[11:6], and D[17:12] of the signal D[17:0] are respectively used as R (red), G (green), and B (blue) data signals, for example. In the case of using the signal lines as the MPU interface bus, the signals HSYNC/RD, VSYNC/WR, CLK/A0, and D[17:0] are respectively used as a read signal, a write signal, an address 0 signal (command/parameter identification signal), and a data signal.

The system bus includes signal lines for signals SCS, SR/W, SA0, SIO, and SCK. These signals are used as serial interface signals. In more detail, the signals SCS, SR/W, SA0, SIO, and SCK are respectively used as a chip select signal, a read/write signal, an address 0 signal, a data signal, and a clock signal for the serial interface. In a 5-pin type serial interface, all of the signals SCS, SR/W, SA0, SIO, and SCK are used. In a 4-pin type serial interface, the signal SR/W is not used. In a 3-pin type serial interface, the signals SR/W and SA0 are not used.

A signal INT is an interrupt signal from the host-side data transfer control device 10 to the system device 5. A terminal CNF[2:0] is a terminal for deciding the interface type between the system device 5 and the host-side data transfer control device 10. The interface between the system device 5 and the host-side data transfer control device 10 may be set to both the RGB interface and the type 80 MPU interface, may be set to both the RGB interface and the type 68 MPU interface, may be set to only the type 80 MPU interface, may be set to only the type 68 MPU interface, or may be set to only the serial interface by the setting of the terminal CNF[2:0].

The host-side data transfer control device 10 includes a link controller 90 (link layer circuit) which performs link layer processing. The link controller 90 performs processing of generating a packet (request packet, stream packet, or the like) transferred to the target-side data transfer control device 30 through the serial bus (LVDS), and transmitting the generated packet. In more detail, the link controller 90 initiates a transmission transaction and directs the transceiver 20 to transmit the generated packet.

The host-side data transfer control device 10 includes the transceiver 20 (PHY) which performs physical layer processing or the like. The transceiver 20 transmits a packet indicated by the link controller 90 to the target-side data transfer control device 30 through the serial bus. The transceiver 20 also receives a packet from the target-side data transfer control device 30. In this case, the link controller 90 analyzes the received packet and performs the link layer (transaction layer) processing.

The host-side data transfer control device 10 includes an internal register 250. The internal register 250 includes a port access register, a configuration register, an LVDS register, an interrupt control register, a target (RX) register, and the like. The system device 5 writes an address (command) or data (parameter) into the internal register 250 through the system bus, or reads read data, status information, or the like from the internal register 250. The content stored in the target register of the internal register 250 is transferred to an internal register 350 of the target-side data transfer control device 30. Specifically, the target-side internal register 350 is a subset (shadow register) of the host-side internal register 250.

The target-side data transfer control device 30 includes the transceiver 40 (PHY) which performs physical layer processing or the like. The transceiver 40 receives a packet from the host-side data transfer control device 10 through the serial bus. The transceiver 40 also transmits a packet to the host-side data transfer control device 10. In this case, a link controller 100 generates a packet to be transmitted and directs transmission of the generated packet.

The target-side data transfer control device 30 includes the link controller 100 (link layer circuit). The link controller 100 performs link layer (transaction layer) processing of receiving a packet from the host-side data transfer control device 10 and analyzing the received packet. A signal TGINT is an interrupt signal from the target-side data transfer control device 30 to the host-side data transfer control device 10.

The target-side data transfer control device 30 includes an interface circuit 110 which performs interface processing between the data transfer control device 30 and an LCD1, an LCD2, a general device GD (first to N-th devices in a broad sense), and the like. The interface circuit 110 generates various interface signals (first to N-th interface signals), and outputs the generated interface signals to the interface bus. In more detail, the interface circuit 110 includes an RGB interface circuit 310, an MPU interface circuit 320, and a serial interface circuit 330 (first to N-th interface circuits in a broad sense). The RGB interface circuit 310, the MPU interface circuit 320, and the serial interface circuit 330 respectively generate and output RGB, MPU, and serial interface signals. The LCD1 and LCD2 are generic terms for a display panel and a display driver which drives the display panel.

The interface bus includes signal lines for signals FPCS1, FPCS2, FPCS3, VCIN1, VCIN2, and WAIT, and buses such as RGB/MPU, SERIAL, and I2C (Inter Integrated Circuit) buses. The signals FPCS1, FPCS2, and FPCS3 are chip select signals. The signals VCIN1 and VCIN2 are signals which indicate completion of writing of one frame, and the signal WAIT is a wait request signal. The RGB/MPU bus is an RGB or MPU interface bus. The RGB/MPU bus includes signal lines for a horizontal synchronization signal (read signal), a vertical synchronization signal (write signal), a clock signal, an address 0 signal, and a data signal in the same manner as the system bus. The SERIAL bus is a serial interface bus, and includes signal lines for a read/write signal, an address 0 signal, a data signal, and a clock signal for serial transfer. The I2C bus is a bus for performing serial transfer between comparatively close locations using two signal lines (clock signal and data signal).

The target-side data transfer control device 30 includes the internal register 350. The internal register 350 stores interface information for specifying the signal type (output format) of the interface signal output from the interface circuit 110 or the like. In more detail, the internal register 350 stores timing information for specifying the timing at which the signal level of the interface signal changes. In this case, the information stored in the host-side internal register 250 necessary for the target is transferred to the target through the serial bus (differential signal lines) and is written into the target-side internal register 350.

The configuration and the operation in this embodiment when the host-side data transfer control device 10 transmits a packet to the target-side data transfer control device 30 are mainly described below for convenience of description. However, the configuration and the operation when the target-side data transfer control device 30 transmits a packet to the host-side data transfer control device 10 are the same as described below.

2. Address Automatic Update

In this embodiment, a packet transferred from the host to the target through the serial bus includes an address automatic update field for setting ON/OFF of an address automatic update mode. When the address automatic update mode in the address automatic update field is set to ON, the target-side interface circuit automatically updates an address, and sequentially outputs signals of automatically updated addresses (equivalent to command) and data (equivalent to parameter) which makes pairs with the addresses.

Figure 2:
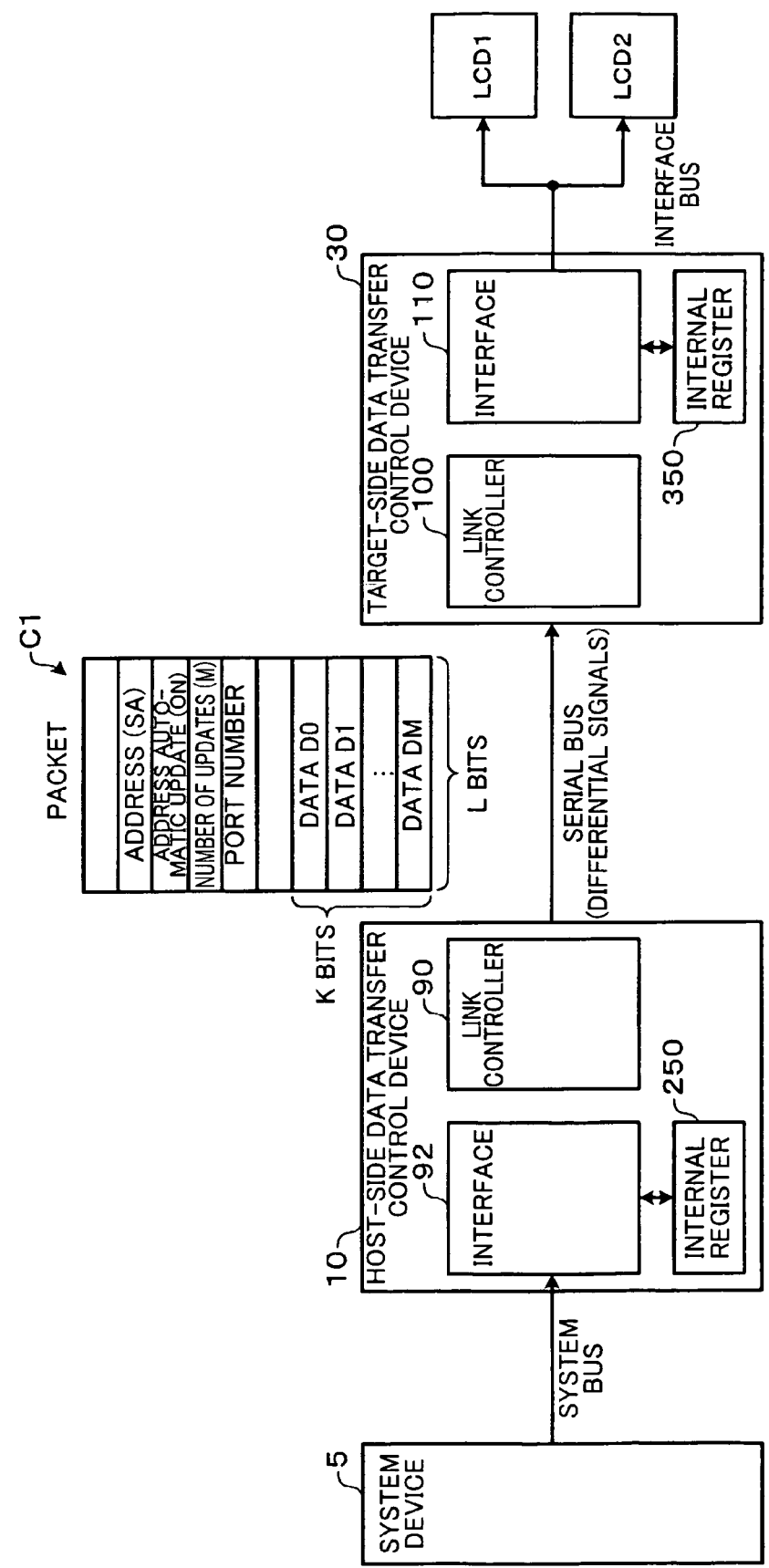
FIG. 2 is illustrative of an address automatic update method in the present embodiment.
Figure 3A:
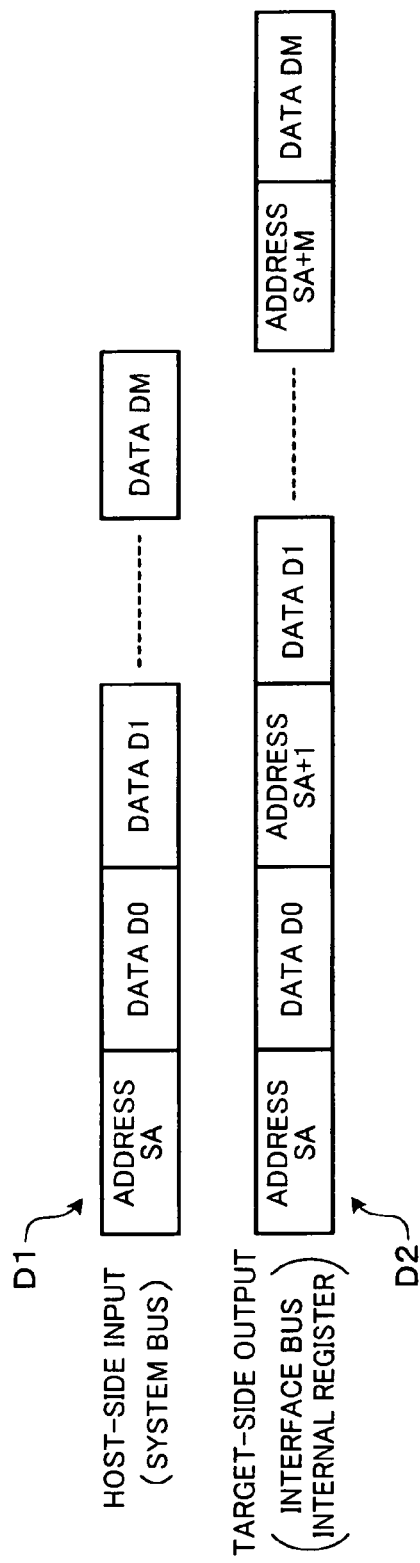
FIGS. 3A and 3B are also illustrative of the address automatic update method in this embodiment.

In FIG. 2, the host-side interface circuit 92 receives a start address SA and data D0, D1, D2, . . . , and DM from the system device 5 (CPU, display controller, or the like) as indicated by D1 shown in FIG. 3A. Each of the data D0, D1, D2, . . . , and DM is L-bit-data, and the total data length is K=L×(M+1) bits (K, L, and M are integers of two or more).

Suppose that the host-side interface circuit 92 has received the start address SA and K bits of data D0 to DM from the system device 5 and the host-side link controller 90 has judged that the transfer mode is the address automatic update mode. As indicated by C1 shown in FIG. 2, the host-side link controller 90 then generates a packet in which the start address SA is set in an address field, the address automatic update mode in the address automatic update field is set to ON, and K bits of data ((M+1) pieces of L-bit-data) are set in a data field. The host-side link controller 90 transmits the generated packet to the target-side data transfer control device 30 through the serial bus.

The target-side link controller 100 analyzes the packet received from the host. When the address automatic update mode in the address automatic update field of the received packet is set to ON, the target-side interface circuit 110 performs address automatic update processing M times using the address set in the packet as the start address SA. As indicated by D2 shown in FIG. 3A, the target-side interface circuit 110 sequentially outputs signals of automatically updated addresses SA, SA+1, SA+2, . . . , and SA+M and signals of the L-bit-data D0, D1, D2, . . . , and DM included in the K bits of data set in the packet which makes pairs with the automatically updated addresses.

In FIG. 2, the packet transferred from the host-side data transfer control device 10 through the serial bus includes a number-of-updates field in which the number-of-address-updates information is set. The target-side interface circuit 110 performs address update processing a number of times (M times) set by the number-of-updates information set in the packet. Therefore, since it is unnecessary for the target to calculate the number of address updates based on the data length or the like, the processing load can be reduced. However, in the case where the processing load imposed on the target does not cause a considerable problem, the target may calculate the number of updates based on the data length or the like without providing the number-of-updates field in the packet. The number-of-updates information also includes information equivalent to the number of updates in addition to the number of updates. A field for update width information for setting the address update width may be provided in the packet in addition to the number-of-updates information.

In FIG. 2, the packet transferred from the host-side data transfer control device through the serial bus includes a port number field for setting the port number. The target-side interface circuit 110 sequentially outputs signals of automatically updated addresses and signals of data which makes pairs with the addresses to a port selected from among ports of the LCD1, LCD2, and the like (one or more devices in a broad sense) connected to the interface bus and ports of the internal register 350 of the target-side data transfer control device 30 based on the port number set in the packet as the destination. This enables the address signals and the data signals as indicated by D2 shown in FIG. 3A to be output to an arbitrary port set by the system device 5 or the like as the destination.

In FIG. 3A, since one data bus is used as the address bus and the data bus and the address signals and the data signals are multiplexed and output to one data bus, the addresses SA, SA+1, SA+2, . . . , and SA+M and the corresponding data D0, D1, D2, . . . , and DM are alternately output to the data bus. However, in the case where the address bus and the data bus are separately provided, the addresses SA, SA+1, SA+2, . . . , and SA+M may be sequentially output to the address bus and the data D0, D1, D2 . . . , and DM may be sequentially output to the data bus in parallel as shown in FIG. 3B.

Figure 3B:
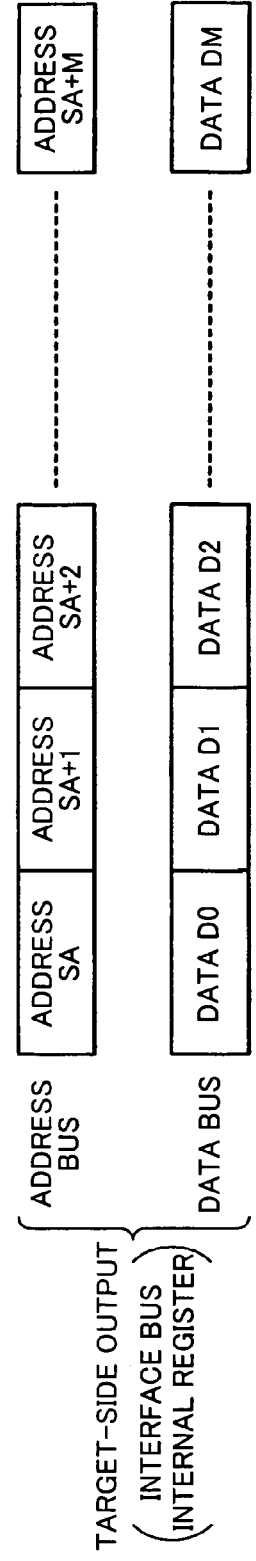

FIGS. 3A and 3B illustrate the case where the address update width is "1" (one byte, for example). However, an arbitrary value (J bytes or more, for example; J is a natural number) may be used as the address update width. For example, the address update width may be set to "2" or more (two bytes or more, for example). FIGS. 3A and 3B illustrate the case where the address is incremented by address automatic update. However, the address may be decremented by address automatic update.

An ordinary portable telephone includes a first instrument section (first shell) provided with buttons for inputting a telephone number or a character, a second instrument section (second shell) provided with a main display, a sub display, or a camera, and a connection section (hinge section) which connects the first and second instrument sections. In this case, the system device 5 is provided in the first instrument section, and the LCD1 which is the main display and the LCD2 which is the sub display are provided in the second instrument section.

In a conventional portable telephone, the system bus of the system device 5 is directly connected with the LCD1 and the LCD2. Therefore, the number of interconnects passing through the connection section between the first and second instrument sections is increased to a large extent, whereby it is difficult to design the connection section. Moreover, EMI noise may occur.

In this embodiment, a packet in which data is set in the data field is transferred from the host to the target through the serial bus using differential signals (may be single-end transfer), for example. Therefore, according to this embodiment, the number of interconnects passing through the connection section can be significantly reduced by providing the interconnect section of the serial bus in the connection section between the first and second instrument sections, whereby the design of the connection section can be facilitated. Moreover, occurrence of EMI noise can be reduced.

The following method may be considered as a comparative example. Specifically, as indicated by E1 shown in FIG. 4, the system device 5 sequentially inputs the address signals and the data signals to the host-side data transfer control device 10 in the order of address SA, data D0, address SA+1, data D1, . . . , address SA+M, and data DM. The host-side data transfer control device 10 samples the address signals and the data signals and transmits the sampling result information to the target-side data transfer control device 30 through the serial bus. The target-side data transfer control device 30 reproduces the sampling result information, whereby the address signals and the data signals are output to the LCD1 or LCD2 in the output order of address SA, data D0, address SA+1, data D1, . . . , address SA+M, and data DM, as indicated by E2 shown in FIG. 4.

Figure 4:
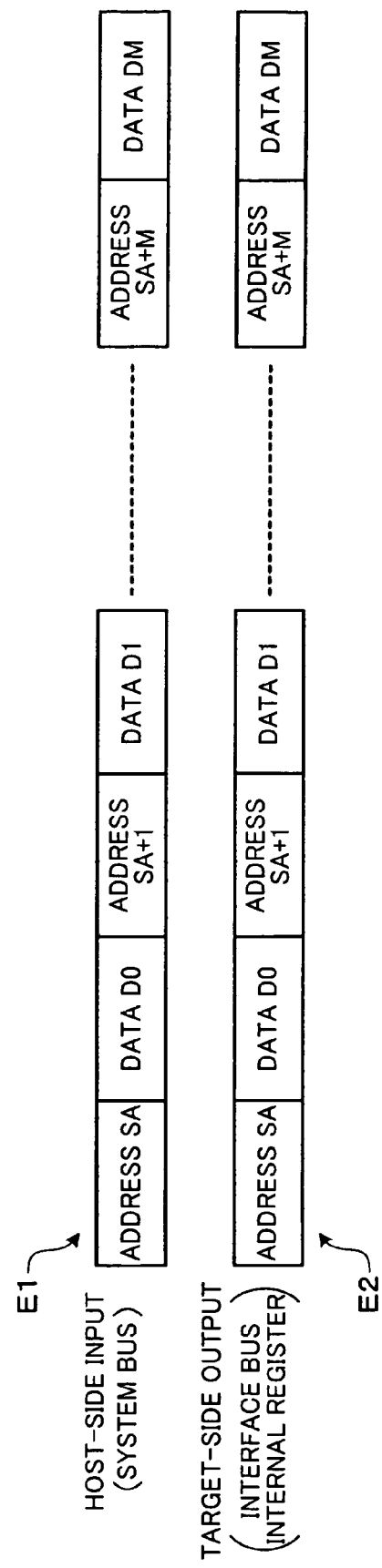
FIG. 4 is illustrative of a method in a comparative example.

However, according to the method in the comparative example, the system device 5 must input not only the data D0 to DM, but also the addresses SA to SA+M to the host-side data transfer control device 10, as indicated by E1 shown in FIG. 4. Therefore, the processing load imposed on the system device 5 is increased, whereby the remaining processing is adversely affected. Moreover, power consumption of the host-side data transfer control device 10 is increased. Furthermore, according to the method in the comparative example, not only the information on the data D0 to DM, but also the information on the addresses SA to SA+M must be transferred from the host to the target through the serial bus using differential signals. Therefore, since the amount of data (amount of traffic) transferred through the serial bus is increased, efficient data transfer cannot be realized.

In this embodiment, it suffices that the system device 5 input only the start address SA and not input the remaining addresses SA+1 to SA+M, as indicated by D1 shown in FIG. 3A. Therefore, the processing load imposed on the system device 5 can be reduced, and power consumption of the host-side data transfer control device 10 can be reduced. Moreover, it is unnecessary to transfer the information on the addresses SA+1 to SA+M from the host to the target through the serial bus using differential signals. Therefore, the amount of data transferred through the serial bus can be reduced, whereby efficient data transfer can be realized.

Figure 5:
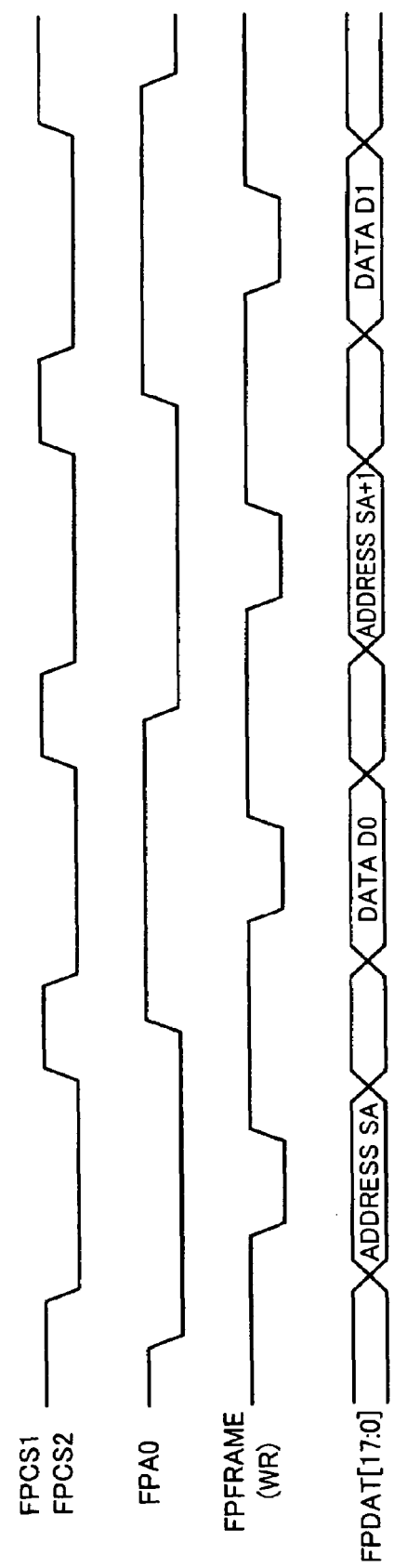
FIG. 5 is a specific example of MPU interface signals.

FIG. 5 shows a specific example of the MPU interface signals output from the interface circuit 110. The MPU interface signal shown in FIG. 5 are generated by the MPU interface circuit 320 of the interface circuit 110. In FIG. 5, signals FPCS1 and FPCS2 are chip select signals, a signal FPA0 is an address 0 signal which is an identification signal of an address (command) and data (parameter), a signal FPFRAME is a write signal, and a signal FPDAT[17:0] is a data signal.

In this embodiment, the interface circuit 110 can also generate the RGB interface signals (vertical synchronization signal, horizontal synchronization signal, and RGB data signal) and the serial interface signals (address 0 signal, read/write signal, serial data signal, and serial clock signal). In this case, the RGB interface circuit 310 generates the RGB interface signals, and the serial interface circuit 330 generates the serial interface signals. The signal FPFRAME shown in FIG. 5 is used as the vertical synchronization signal in the RGB interface. In this embodiment, the signal FPLINE is used as the horizontal synchronization signal in the RGB interface, and is used as the read signal in the MPU interface. In this embodiment, the signal lines of the interface bus are used (multiplexed) by different types of interface signals in order to reduce the number of signal lines (number of terminals).

3. Generation of Interface Signal Based on Interface Information

In this embodiment, the target (RX) side interface circuit 110 automatically generates the interface signals (interface control signal and data signal) based on the interface information set in advance. In more detail, the interface information for specifying the signal type of the interface signal (information for specifying the type of the interface signal and the output format and the output timing of the interface signal) is set in the target-side internal register 350, and the interface circuit 110 reads the interface information from the internal register 350. The interface circuit 110 includes the RGB interface circuit 310, the MPU interface circuit 320, and the serial interface circuit 330 (first to N-th interface circuits in a broad sense). The RGB interface circuit 310, the MPU interface circuit 320, and the serial interface circuit 330 generate and output the interface signals (MPU interface signal, RGB interface signal, or serial interface signal) of the signal type (output format) according to the interface information set in the internal register 350.

In more detail, the interface circuit 110 (MPU interface circuit 320) outputs signals of the automatically updated addresses SA to SA+M and signals of the data D0 to DM which makes pairs with the automatically updated addresses SA to SA+M as the interface signals in a signal type according to the interface information set in the internal register 350.

Figure 6A:
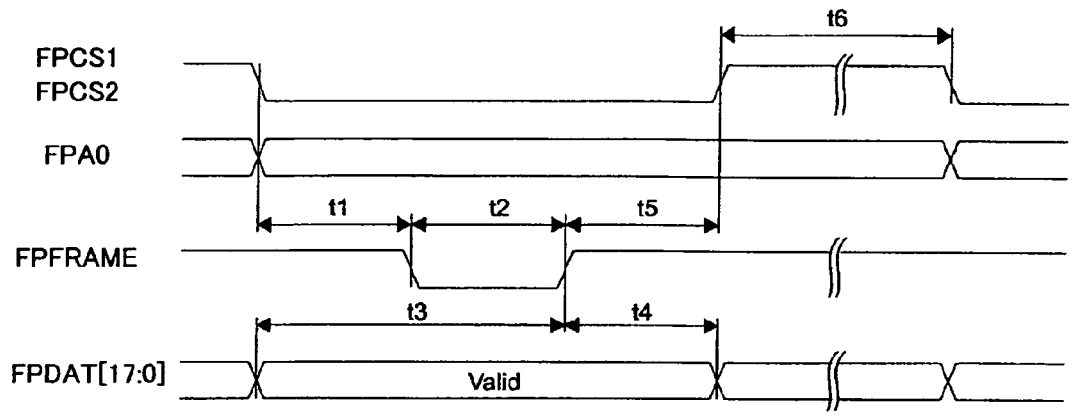
FIGS. 6A and 6B are waveform examples of MPU interface signals of various types.
Figure 6B:
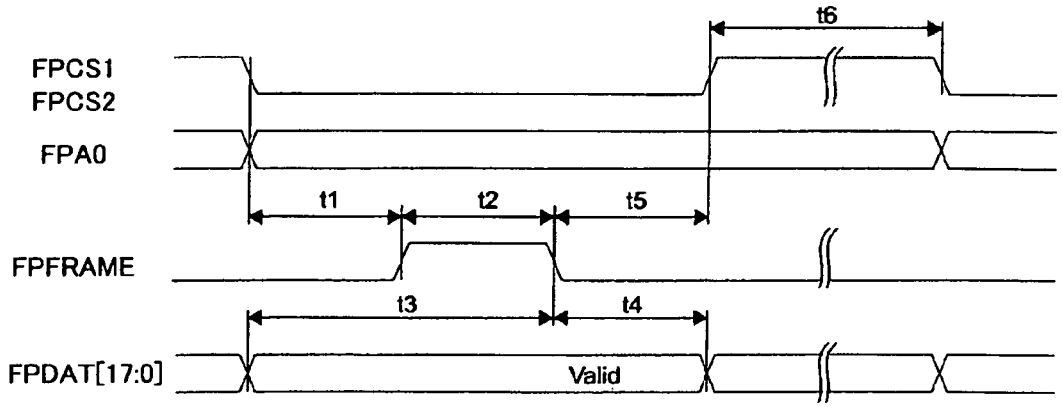

FIGS. 6A and 6B show waveform examples of the MPU interface signals generated by the MPU interface circuit 320. FIG. 6A is a waveform example of the type 80 MPU (parallel) interface signals, and FIG. 6B is a waveform example of the type 68 MPU interface signals.

In this embodiment, the interface information which specifies the signal type of the MPU interface signals shown in FIGS. 6A and 6B is set in the internal register 350. In more detail, the interface information such as the type (type 80 or type 68) of the MPU interface, the polarity of the parameter/command (data/address), the data direction, and the data format (number of bits) is set in the internal register 350. The interface circuit 110 (MPU interface circuit 320) generates the interface signals including the address signal and the data signal based on the set interface information. This enables a data transfer control device which can flexibly deal with various interfaces of devices connected thereto to be provided.

In more detail, there may be a case where the system device 5 does not include the MPU interface and includes only the serial interface. In this case, the MPU interface signals as shown in FIGS. 6A and 6B cannot be output to the LCD1 and the LCD2 connected to the interface bus using the method in the comparative example in which the interface signal from the system device 5 is merely sampled.

In this embodiment, the interface information on the MPU interface is set in the internal register 350. The MPU interface circuit 320 can arbitrarily output the MPU interface signal of the signal type according to the interface information set in the internal register 350. Therefore, even if the system device 5 includes only the serial interface, the MPU interface signal of a proper signal type as shown in FIGS. 6A and 6B can be output to the LCD1 and the LCD2.

There may be a case where the type of the MPU interface of the system device 5 is the type 80 shown in FIG. 5A and the type of the MPU interface of the LCD1 and the LCD2 is the type 68 shown in FIG. 5B. It is possible to deal with such a case by setting the MPU interface type of the interface information set in the target-side internal register 350 to the type 68 shown in FIG. 5B.

The interface information set in the internal register 350 may include information for setting the signal type of the RGB interface signal and the serial interface signal generated by the RGB interface circuit 310 and the serial interface circuit 330. In the RGB interface, the timing information for setting the change timing of the signal level of the interface signal (vertical synchronization signal, horizontal synchronization signal, or the like) may be set in the internal register 350 as the interface information, for example. As such timing information, HT, HDP, HDPS, HPW, VT, VDP, VDPS, VPW, and the like can be given. HT (Horizontal Total) is the length of a horizontal synchronization period. HDP (Horizontal Display Period) is the length of a display period in the horizontal synchronization period. HDPS (Horizontal Display Period Start position) is the start position of the display period in the horizontal synchronization period. HPW (Horizontal Pulse Width) is the pulse width of the horizontal synchronization signal. VT (Vertical Total) is the length of a vertical synchronization period. VDP (Vertical Display Period) is the length of a display period in the vertical synchronization period. VDPS (Vertical Display Period Start position) is the start position of the display period in the vertical synchronization period. VPW (Vertical Pulse Width) is the pulse width of the vertical synchronization signal.

The interface information in the internal register 350 is set based on a packet received from the host-side data transfer control device 10 through the serial bus (LVDS). Specifically, the system device 5 sets the interface information (output format) on the interface signal in the host-side internal register 250 as an initial setting before performing data transfer. The system device 5 directs start of register transfer using a register transfer start register included in the internal register 250. The interface information written into the internal register 250 is then packet-transferred from the host-side data transfer control device 10 to the target-side data transfer control device 30 through the serial bus. In more detail, a packet in which the interface information is set in a data field is packet-transferred, for example. The transferred interface information is written into the target-side internal register 350.

After the above-described initial setting, the system device writes data into a port write register of the internal register 250. As a result, a packet in which data is set in the data field is transmitted from the host-side data transfer control device 10 to the target-side data transfer control device 30 through the serial bus. The RGB interface circuit 310, the MPU interface circuit 320, and the serial interface circuit 330 of the interface circuit 110 respectively output the RGB interface signal, the MPU interface signal, and the serial interface signal of the signal type according to the interface information set in the internal register 350 to the interface bus. In more detail, the interface control signal and the data signal which make up the interface signals are output to each port of the devices such as the LCD1 and the LCD2 through the interface bus. This enables the devices such as the LCD1 and the LCD2 to perform a display operation based on display data, for example.

This makes it unnecessary for the host-side data transfer control device 10 to sample the interface signals from the system device 5 using a sampling clock signal at a high frequency, whereby power consumption can be reduced. Moreover, an interface signal of a proper signal type can be generated without successively transferring detailed information on the interface signal from the host to the target. Therefore, the amount of data transferred through the serial bus can be reduced, whereby efficient data transfer can be realized.

4. Packet Configuration

FIGS. 7A and 7B show format examples of packets transferred through the serial bus (LVDS). The field configuration and the field arrangement of each packet are not limited to the examples shown in FIGS. 7A and 7B. Various modifications and variations may be made.

A request packet (write request packet or read request packet) shown in FIG. 7A is a packet for requesting writing or reading of data (parameter). The request packet includes fields of response request, packet type, label, retry, address size, data length, address (command), continuous, address automatic update, number of updates, port number, data (parameter), and cyclic redundancy check (CRC). The read request packet does not include the data field.

The response request field is a field for indicating whether or not to perform handshake using an acknowledge packet. The packet type field is a field for indicating the type of the packet. In this embodiment, a write request packet, a read request packet, a response packet, an acknowledge packet, a stream packet, and the like are included as the packet types. The label field is a field for setting a label for distinguishing the current transaction from other transactions. The retry field is a field for indicating whether or not the current transaction performs a retry. The address size field is a field for indicating the size of an address set in the address field of the packet. The data length field is a field for indicating the length of write data or read data. The address (command) field is a field for indicating the address of the data access destination (write destination or read destination). The address automatic update field is a field for setting an address automatic update mode, and the number-of-updates field is a field for setting the number of automatic updates of the address. The port number field is a field for setting the port number. The data (parameter) field is a field for setting data transferred by the packet. The CRC field is a field for checking an error of the header and data of the packet.

The stream packet shown in FIG. 7B is a packet for performing stream transfer of data (parameter). The stream transfer is data transfer which realizes high-speed and continuous transfer while maintaining isochronicity between the transmitter side and the receiver side. The stream packet includes fields of packet type, label, data length, address (command), synchronization signal code, port number, data (parameter), and CRC.

5. Port Number

FIG. 8 shows an example of the port number set in the port number field of a packet. Various ports can be selected as the destination of packet transfer by using the port number. For example, when the port number set in a packet is "01", a parallel port (RGB/MPU port) of the LCD1 is the destination of packet transfer (data set in the packet or the like). When the port number is "02", "03", "04", "05", or "06", a serial port of the LCD1, a parallel port (MPU port) of the LCD2, a serial port of the LCD2, a parallel port of the LCD3 (not shown), or a serial port of the LCD3 is the destination of packet transfer, respectively. When the port number is "10", "11", "12", or "3F", the general port 1, 2, or 3, or the internal register 350 is the destination of packet transfer, respectively.

In this embodiment, the output destination of the interface signal is set using the port number. In more detail, the interface circuit 110 outputs the interface signal to the port selected from among the ports of the LCD1, the LCD2, and the general device GD (one or more devices in a broad sense) connected to the interface bus and the ports of the internal register 350 based on the port number set in a packet as the destination.

For example, when the port number set in a packet is "01", the interface signal including a signal of data set in the packet is output to the parallel port (RGB/MPU port) of the LCD1 as the destination. Specifically, the LCD1 is selected by the chip select signal FPCS1 shown in FIG. 1, and the interface signals (packet data signal and interface control signal) generated by the RGB interface circuit 310 or the MPU interface circuit 320 are output to the LCD1. When the port number set in a packet is "02", the LCD1 is selected by the chip select signal FPCS1, and the interface signals generated by the serial interface circuit 330 are output to the LCD1. When the port number set in a packet is "03", the LCD2 is selected by the chip select signal FPCS2, and the interface signals generated by the MPU interface circuit 320 are output to the LCD2. When the port number set in a packet is "04", the LCD2 is selected by the chip select signal FPCS2, and the interface signals generated by the serial interface circuit 330 are output to the LCD2.

When the port number set in a packet is "3F", the information transferred by the packet is output to the target-side internal register 350. This enables the information stored in the host-side internal register 250 to be transferred to the target-side internal register 350.

6. Internal Register

Figure 9:
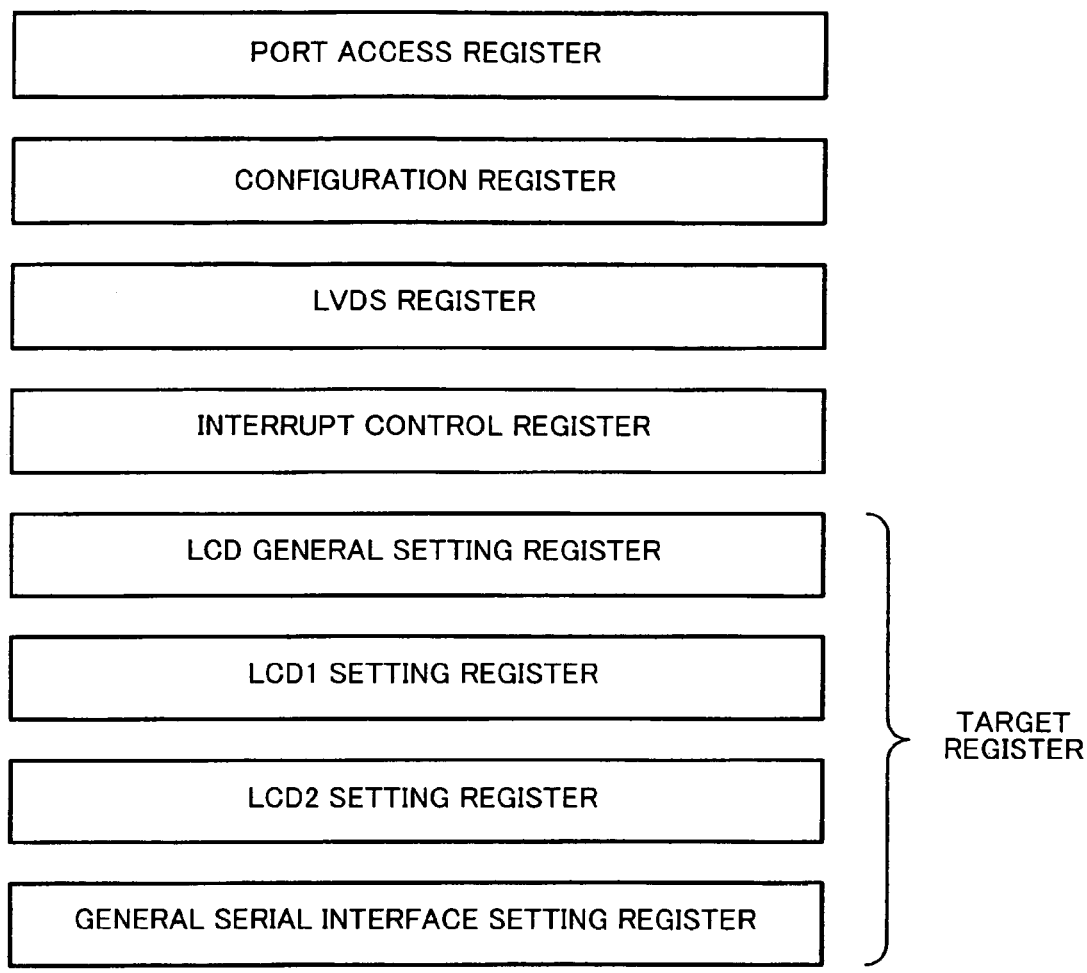
FIG. 9 is a configuration example of an internal register.

FIG. 9 shows a register configuration example of the host-side internal register 250. The host-side internal register 250 includes a port access register, a configuration register, an LVDS register, an interrupt control register, an LCD general setting register, an LCD1 setting register, an LCD2 setting register, a general serial interface setting register, and the like. Of these host-side registers, the LCD general setting register, the LCD1 setting register, the LCD2 setting register, and the general serial interface setting register are also target registers (shadow registers). Specifically, when the system device 5 has set information in these target registers and has directed start of register transfer, the content of the target registers is transferred from the host to the target through the serial bus and is written into the target-side internal register 350. FIG. 10A shows a register configuration example of the port access register. In FIG. 10A, a register transfer start register is a register for the system device 5 to direct transfer of information on the register from the host-side internal register 250 to the target-side internal register 350. A register transfer start pointer register and a register transfer end pointer register are registers for the system device 5 to indicate a start pointer and an end pointer of the register to which the register information is transferred.

A write port command register shown in FIG. 10A is a register for the system device 5 to write a command (address) to be transmitted to a port. A write port parameter register is a register for the system device 5 to write a parameter (data) to be transmitted to a port. The read port parameter register is a register for the system device 5 to read a parameter (data) received from a port.

In this embodiment, the interface information for specifying the signal type of the interface signal output from the interface circuit 110 is set in the target (RX) register. FIG. 10B shows a configuration example of the LCD general setting register which is one of the target registers (interface information registers). The LCD general setting register includes bits for setting the polarity of a ready signal FPDRDY of the RGB interface, the data width of the RGB interface bus, the presence or absence of video inversion, display blank, the polarity of a clock signal FPSHIFT of the RGB interface, and the like. The LCD general setting register also includes bits for setting output enable of the control signal of the RGB interface and enable of data transfer of the RGB interface and bits for selecting the interface.

As shown in FIG. 10C, in a mode 1 in which the interface select register bit value is "00", the LCD1 and LCD2 interfaces are set to the RGB interface and the MPU interface, respectively. Therefore, when the mode 1 is set, the RGB interface circuit 310 and the MPU interface circuit 320 respectively generate the interface signals transmitted to the LCD1 and the LCD2. In a mode 2 in which the register bit value is "01", the LCD1 and LCD2 interfaces are set to the RGB interface and the serial interface, respectively. Therefore, when the mode 2 is set, the RGB interface circuit 310 and the serial interface circuit 330 respectively generate the interface signals transmitted to the LCD1 and the LCD2. The modes 3 and 4 of which the register bit values are respectively "10" and "11" are as shown in FIG. 10C.

FIG. 11A shows a configuration example of the LCD 1 setting register which is one of the target registers. The LCD1 setting register includes a timing information register in which the timing information HT, HDP, HDPS, HPW, VT, VDP, VDPS, and VPW of the RGB interface is set. The LCD1 setting register includes an MPU interface setting register and a serial interface setting register. The LCD2 setting register shown in FIG. 11B also includes an MPU interface setting register and a serial interface setting register.

FIG. 11C shows a configuration example of the MPU interface setting register and the serial interface setting register. The MPU interface setting register includes bits for setting the type selection for selecting whether the type is type 80 (FIG. 6A) or type 68 (FIG. 6B), the parameter/command polarity (polarity of address A0), the data direction, the data format (selection of 8, 16, or 18 bits), and the like. The serial interface setting register includes bits for setting the data type (selection of 3, 4, or 5 pins and selection of 8, 9, 16, or 17 bits), the data direction, the serial clock signal phase, the serial clock signal polarity, and the like.

As described above, in this embodiment, the signal type (output format) of the interface signal output from the interface circuit 110 can be set to various signal types by setting the interface information in the target register.

7. Detailed Example of Processing

Figure 12:
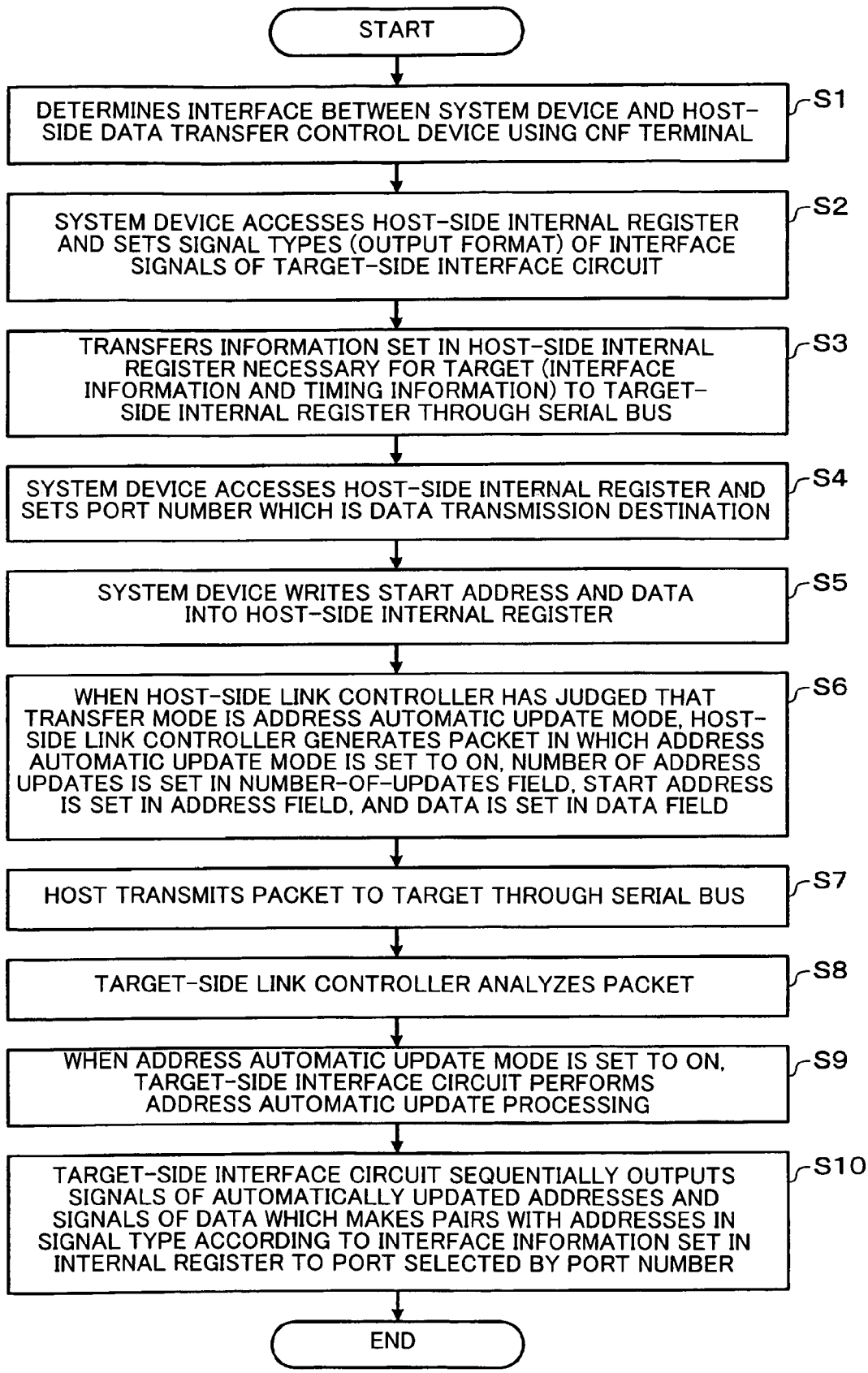
FIG. 12 is a flowchart showing a detailed processing example in this embodiment.

A detailed example of processing in this embodiment is described below using a flowchart shown in FIG. 12. The interface between the system device 5 and the host-side data transfer control device 10 is determined using the CNF terminal [2:0] shown in FIG. 1 (step S1). The system device 5 accesses the host-side internal register 250 and sets the signal types (output format) of the interface signals of the target-side interface circuit 110 (step S2). Information (interface information and timing information) set in the host-side internal register 250 necessary for the target is transferred to the target-side internal register 350 through the serial bus (step S3).

The system device 5 accesses the host-side internal register 250 and sets the port number which is the data transmission destination (step S4). The system device 5 then writes the start address (SA in FIGS. 3A and 3B) and data (D0 to DM in FIGS. 3A and 3B) in the host-side internal register 250 (step S5).

When the host-side link controller 90 has judged that the transfer mode is the address automatic update mode, the host-side link controller 90 generates a packet in which the address automatic update mode in the address automatic update field is set to ON, the number of address updates is set in the number-of-updates field, the start address is set in the address field, and data is set in the data field as described with reference to FIG. 2 (step S6). Then, the host transmits the packet to the target through the serial bus (step S7).

Whether or not the transfer mode is the address automatic update mode may be judged by using various methods. For example, a register for setting ON/OFF of the address automatic update mode is provided in the internal register 250. The transfer mode may be judged to be the address automatic update mode when the system device 5 sets the address automatic update mode of this register to ON. Or, the system device 5 writes the start address into the write port command register shown in FIG. 10A, and sequentially writes K bits of data into the write port parameter register. When the system device 5 has written another command (address) into the write port parameter register thereafter, the transfer mode may be judged to be the address automatic update mode. Specifically, the K bits of data written into the write port parameter register are judged to be data which should be transferred in the address automatic update mode.

The target-side link controller 100 then analyzes the received packet (step S8). When the address automatic update mode in the address automatic update field of the packet is set to ON, the target-side interface circuit 110 performs address automatic update processing (step S9). The target-side interface circuit 110 sequentially outputs signals of automatically updated addresses (SA to SA+M) and signals of data (D1 to DM) which makes pairs with the addresses in a signal type according to the interface information set in the internal register 350 to the port selected by the port number (step As described above, in this embodiment, the interface information for specifying the signal type of the interface signal output from the target-side interface circuit 110 (timing information for specifying the timing at which the signal level of the interface signal changes in a narrow sense) is set in the host-side internal register 250 by the system device 5. The host-side link controller 90 generates a packet including the interface information (timing information) set in the host-side internal register 250, and transmits the generated packet to the target-side data transfer control device 30 through the serial bus using differential signals. In more detail, when the system device 5 has directed start of transfer using the register transfer start register (see FIG. 10A) included in the internal register 250, the link controller 90 generates a packet including the interface information (timing information) and transmits (directs transmission of) the generated packet. The host-side link controller 90 generates a packet in which data is set in the data field after the packet including the interface information (timing information) has been transmitted, and transmits the generated packet to the target-side data transfer control device 30. This enables the interface signal to be efficiently generated using the interface information (timing information).

In this embodiment, since the target automatically updates the address and outputs the updated address, even if the system device 5 does not input all the addresses (SA to SA+M), the processing load imposed on the system device 5 can be reduced. Moreover, since the amount of data transferred through the serial bus can be reduced, efficient data transfer can be achieved.

8. Serial Transfer Method Using Differential Signals

A serial transfer method in this embodiment and a configuration example of the transceivers 20 and 40 are described below with reference to FIG. 13.

Figure 13:
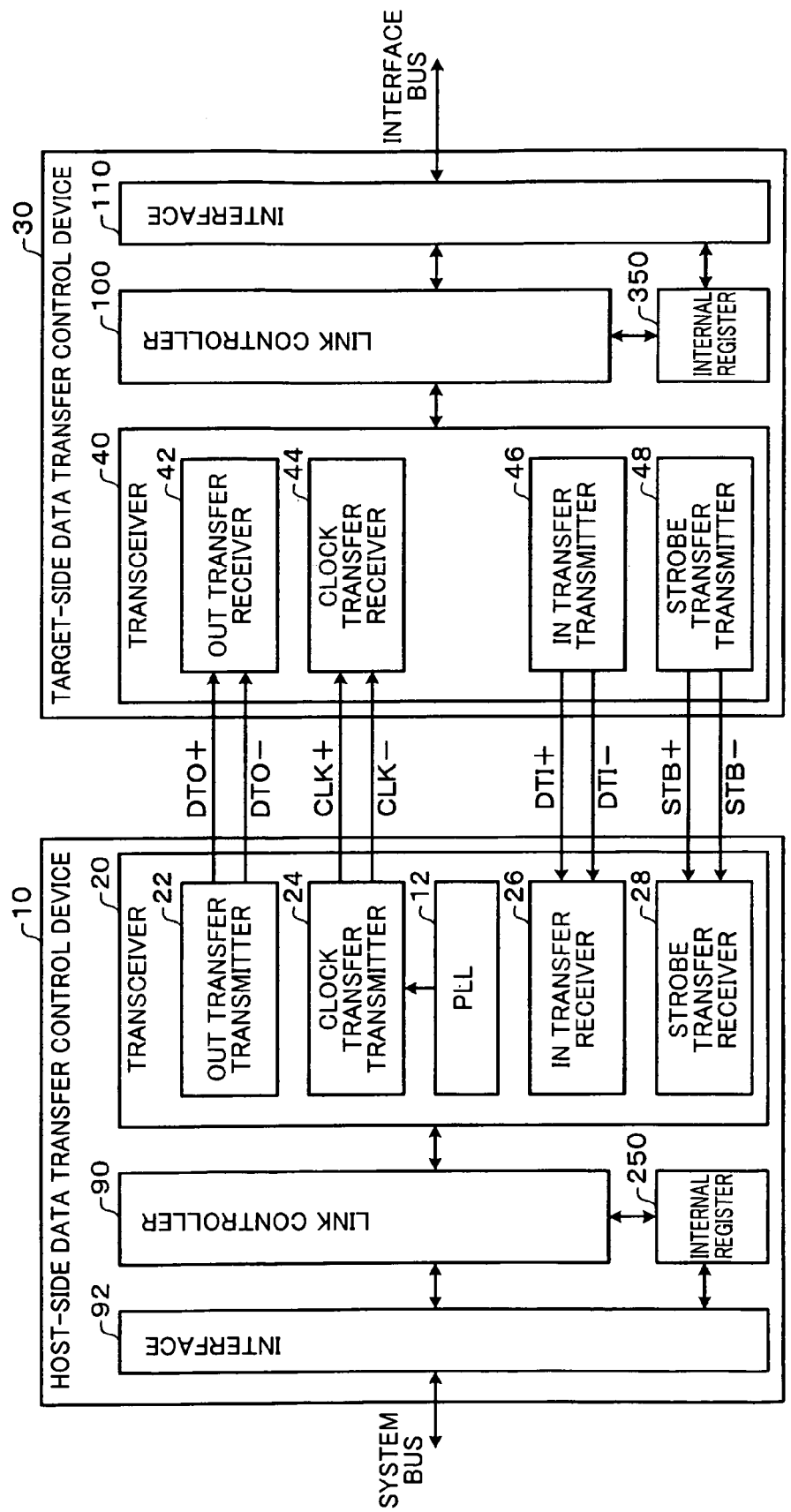
FIG. 13 is a configuration example of host-side and target-side transceivers.

In FIG. 13, DTO+ and DTO− indicate data (OUT data) output from the host (data transfer control device 10) to the target (data transfer control device 30). CLK+ and CLK− indicate clock signals supplied from the host to the target. The host outputs the data DTO+/− in synchronization with the edge (rising edge for example; may be falling edge) of the clock signals CLK+/−. Therefore, the target can sample and store the data DTO+/− using the clock signals CLK+/−. In FIG. 13, the target operates based on the clock signals CLK+/− supplied from the host. Specifically, the clock signals CLK+/− serve as the system clock signal of the target. Therefore, a phase locked loop (PLL) circuit 12 (clock generation circuit in a broad sense) is provided in the host, and is not provided in the target.

DTI+ and DTI− indicate data (IN data) output from the target to the host. STB+ and STB− indicate strobes (clock signals in a broad sense) supplied from the target to the host. The target generates the strobes STB+/− based on the clock signals CLK+/− supplied from the host, and outputs the generated strobes STB+/−. The target outputs the data DTI+/− in synchronization with the edge (rising edge, for example; may be falling edge) of the strobes STB+/−. Therefore, the host can sample and store the data DTI+/− using the strobes STB+/−.

Each of the data DTO+/−, the clock signals CLK+/−, the data DTI+/−, and the strobes STB+/− is transmitted by causing a transmitter circuit (driver circuit) to current-drive the corresponding differential signal line. In order to realize transfer at higher speed, two or more pairs of the DTO+/− differential signal lines and the DTI+/− differential signal lines may be provided.

The host-side transceiver 20 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. The target-side transceiver 40 includes OUT transfer and clock transfer receiver circuits 42 and 44, and IN transfer and strobe transfer transmitter circuits 46 and 48. A configuration in which some of these circuit blocks are omitted may be employed.

The OUT transfer and clock transfer transmitter circuits 22 and 24 respectively transmit the data DTO+/− and the clock signals CLK+/− by current-driving the DTO+/− differential signal lines and the CLK+/− differential signal lines. The OUT transfer and clock transfer receiver circuits 42 and 44 respectively receive the data DTO+/− and the clock signals CLK+/− by performing a current/voltage conversion based on the current which flows through the DTO+/− differential signal lines and the CLK+/− differential signal lines, and performing comparison processing (differential amplification processing) between differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/− differential signal lines and the STB+/− differential signal lines. The IN transfer and strobe transfer receiver circuits 26 and 28 respectively receive the data DTI+/− and the strobes STB+/− by performing a current/voltage conversion based on the current which flows through the DTI+/− differential signal lines and the STB+/− differential signal lines, and performing comparison processing (differential amplification processing) between differential voltage signals (first and second voltage signals) obtained by the current/voltage conversion.

The transceivers 20 and 40 may include a parallel/serial conversion circuit, a serial/parallel conversion circuit, a code (8B/10B code, for example) encoder circuit, a decoder circuit, a code addition circuit, an error signal generation circuit, a frequency divider circuit, and the like in addition to the circuit blocks shown in FIG. 13. Some of these circuits may be included in the link controllers 90 and 100.

9. Configuration Example of Link Controller and Interface Circuit

Figure 14:
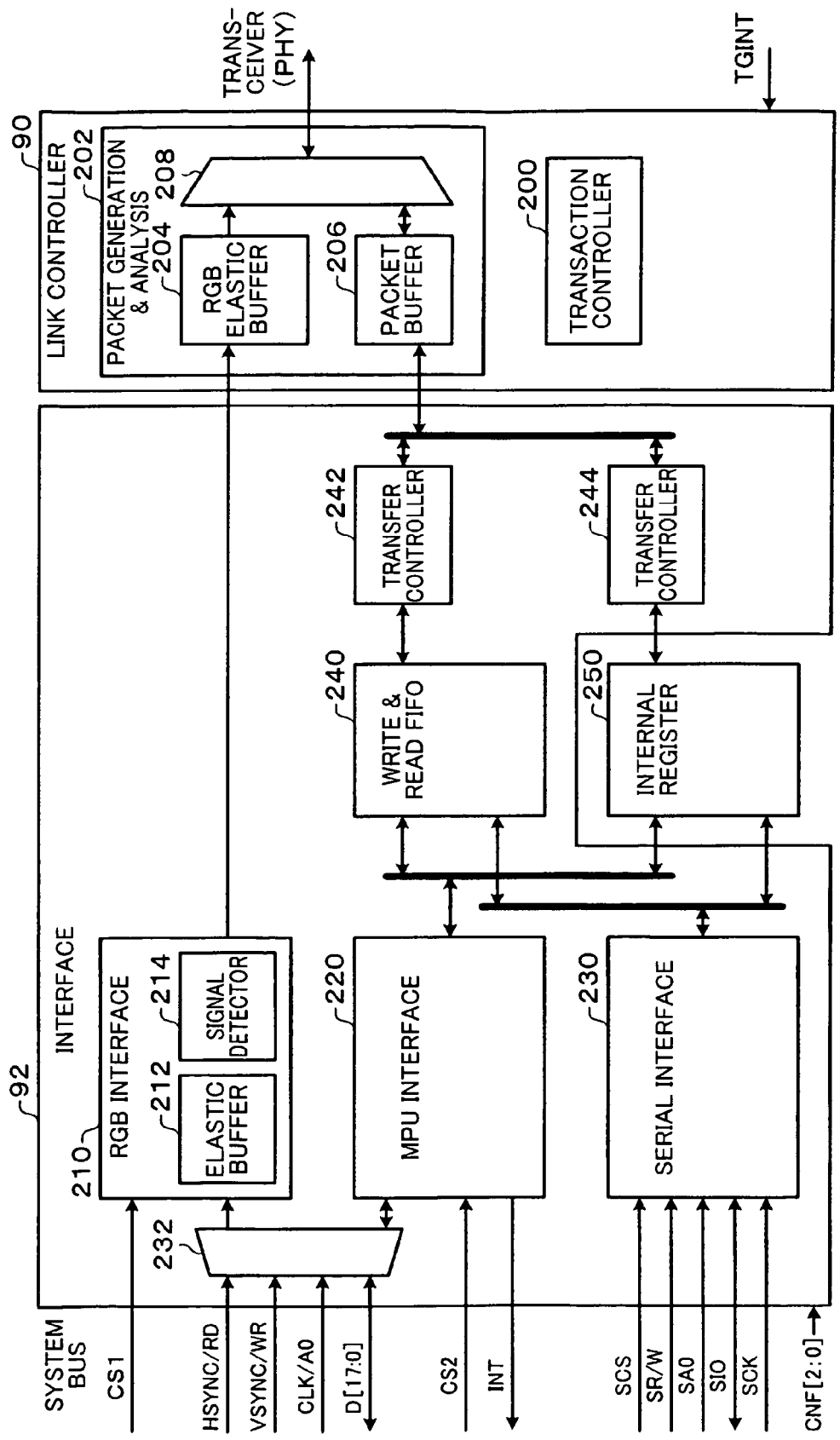
FIG. 14 is a configuration example of a host-side link controller and interface circuit.
Figure 15:
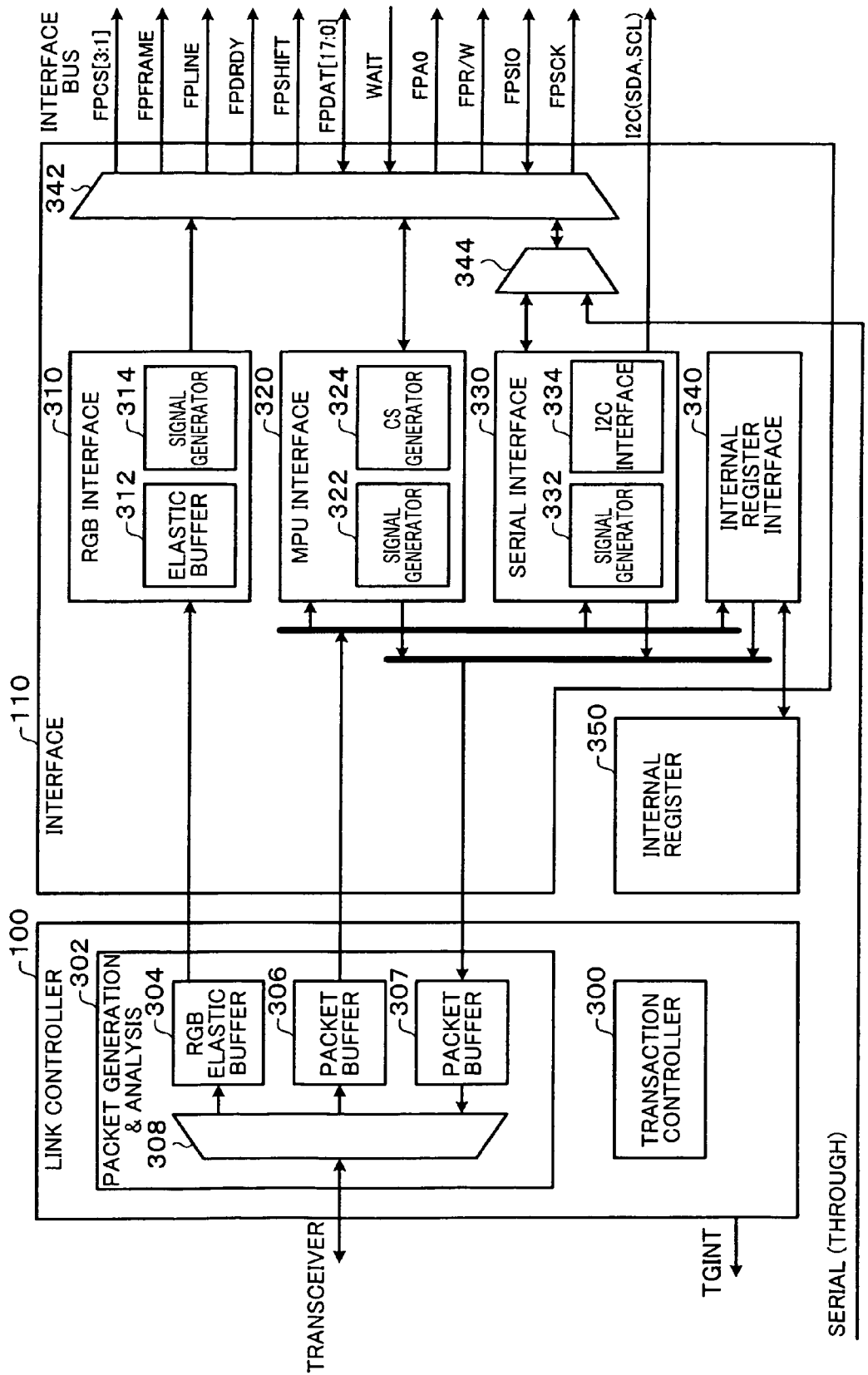
FIG. 15 is a configuration example of a target-side link controller and interface circuit.

FIGS. 14 and 15 show configuration examples of the host-side link controller 90 and interface circuit 92 and the target-side link controller 100 and interface circuit 110. The link controller and the interface circuit in this embodiment are not limited to the configurations shown in FIGS. 14 and 15. Some of the circuit blocks shown in FIGS. 14 and 15 may be omitted, or the connection configuration between the circuit blocks may be changed, or a circuit block differing from the circuit blocks shown in FIGS. 14 and 15 may be added.

FIG. 14 is a configuration example of the host-side link controller 90 and interface circuit 92. The link controller 90 includes a transaction controller 200 and a packet generation & analysis circuit 202. The link controller 90 may have a configuration in which some of these blocks are omitted.

The transaction controller 200 performs transaction layer processing of data transfer. In more detail, the transaction controller 200 controls transfer of packets such as a request packet, a stream packet, and an acknowledge packet, and controls transaction made up of a plurality of packets.

The packet generation & analysis circuit 202 performs processing of generating a packet of which the transfer is directed by the transaction controller 200 and processing of analyzing a packet received from the target. In more detail, the packet generation & analysis circuit 202 receives information on the header and data from the interface circuit 92, and assembles a packet by combining the header and the data. The packet generation & analysis circuit 202 separates the packet received from the target into a header and data, and performs analysis processing of the received packet.

The packet generation & analysis circuit 202 includes an RGB elastic buffer 204, a packet buffer 206, and a multiplexer 208 (demultiplexer). The information on the RGB interface signal received from the interface circuit 92 is input to the RGB elastic buffer 204 which functions as a FIFO, and is transferred to the transceiver 20 through the multiplexer 208. The packet information (header and data information) received from the interface circuit 92 is input to the packet buffer 206 which functions as a FIFO, and is transferred to the transceiver 20 through the multiplexer 208. The packet information received from the transceiver 20 is transferred to the interface circuit 92 through the multiplexer 208 and the packet buffer 206.

The interface circuit 92 includes an RGB interface circuit 210, an MPU interface circuit 220, a serial interface circuit 230, a multiplexer (demultiplexer) 232, a write & read FIFO 240, and transfer controllers 242 and 244. The electronic instrument may have a configuration in which some of these blocks are omitted. The RGB interface circuit 210, the MPU interface circuit 220, and the serial interface circuit 230 are circuits for respectively performing RGB, MPU, and serial interface processing with the system device 5.

When the RGB interface is selected using the terminal CNF[2:0], the operation of the RGB interface circuit 210 is enabled. The RGB interface signals such as the horizontal synchronization signal HSYNC, the vertical synchronization signal VSYNC, the clock signal CLK, and the RGB data signal D[17:0] received from the system device 5 are input to the RGB interface circuit 210 through the multiplexer 232. The RGB data is temporarily stored in an elastic buffer 212 which functions as a FIFO. A signal detector 214 performs edge detection processing of the horizontal synchronization signal or the vertical synchronization signal or sampling processing of the edge detection signal and RGB data signal.

When the MPU interface is selected through the terminal CNF[2:0], the operation of the MPU interface circuit 220 is enabled. The MPU interface signals such as the read signal RD, the write signal WR, the address 0 signal A0, and the data signal D[17:0] received from the system device 5 are input to the MPU interface circuit 220 through the multiplexer 232. During reading, a read data signal from the MPU interface circuit 220 is output to the system bus as the data signal D[17:0] through the multiplexer 232.

When the serial interface is selected through the terminal CNF[2:0], the operation of the serial interface circuit 230 is enabled. The serial interface signals such as the chip select signal SCS, the read/write signal SR/W, the address 0 signal SA0, the data signal SIO, and the clock signal SCK received from the system device 5 are input to the serial interface circuit 230. During reading, a read data signal from the serial interface circuit 230 is output to the system bus as the data signal SIO.

The system device 5 accesses the internal register 250 through the MPU interface circuit 220 or the serial interface circuit 230, and sets various types of information in the internal register 250. The information stored in the write & read FIFO 240 and the internal register 250 is transferred to the link controller 90 through the transfer controllers 242 and 244. For example, the interface information (timing information) stored in the host-side internal register 250 is transferred to the link controller 90 through the transfer controller 244, and is transmitted to the target. The information received from the link controller 90 is written into the write & read FIFO 240 and the internal register 250 through the transfer controllers 242 and 244.

FIG. 15 is a configuration example of the target-side link controller 100 and interface circuit 110. The link controller 100 includes a transaction controller 300 and a packet generation & analysis circuit 302. The electronic instrument may have a configuration in which some of these blocks are omitted.

The transaction controller 300 performs transaction layer processing of data transfer. The packet generation & analysis circuit 302 performs processing of generating a packet of which the transfer is directed by the transaction controller 300 and processing of analyzing a packet received from the host. In more detail, the packet generation & analysis circuit 302 receives information on the header and data from the interface circuit 110, and assembles a packet by combining the header and the data. The packet generation & analysis circuit 302 separates a packet received from the host into a header and data, and performs analysis processing of the received packet.

The packet generation & analysis circuit 302 includes an RGB elastic buffer 304, a reception packet buffer 306, a transmission packet buffer 307, and a multiplexer 308 (demultiplexer). The information on the RGB interface signal included in the packet information received from the transceiver 40 through the multiplexer 308 is input to the RGB elastic buffer 304 which functions as a FIFO, and is transferred to the interface circuit 110 (RGB interface circuit 310). The packet information received from the transceiver 40 through the multiplexer 308 is input to the packet buffer 306 which functions as a FIFO, and is transferred to the interface circuit 110. The packet information received from the interface circuit 110 is input to the packet buffer 307, and is transferred to the transceiver 40 through the multiplexer 308.

The interface circuit 110 includes the RGB interface circuit 310, the MPU interface circuit 320, the serial interface circuit 330, an internal register interface circuit 340, and multiplexers (demultiplexers) 342 and 344. The electronic instrument may have a configuration in which some of these blocks are omitted.

The RGB interface circuit 310, the MPU interface circuit 320, and the serial interface circuit 330 are circuits for respectively performing RGB, MPU, and serial interface processing with the devices such as the LCD1, LCD2, and GD connected to the interface bus. The internal register interface circuit 340 is a circuit for performing processing of writing information (interface information and timing information) transferred from the host into the internal register 350.

The information on the RGB interface signal (RGB data and synchronization signal code) received from the link controller 100 is input to the RGB interface circuit 310. The RGB data is temporarily stored in an elastic buffer 312 which functions as a FIFO. The RGB interface signals such as the vertical synchronization signal, the horizontal synchronization signal, the ready signal, the clock signal, and the data signal are generated by a signal generator 314, and output as the signals FPFRAME, FPLINE, FPDRDY, FPSHIFT, and FPDAT[17:0] through the multiplexer 342.

The information on the MPU interface signal (MPU data) received from the link controller 100 is input to the MPU interface circuit 320. The MPU interface signals such as the write (read) signal, the data signal, and the address 0 signal are generated by a signal generator 322, and output as the signals FPFRAME (FPLINE), FPDAT[17:0], and FPA0 through the multiplexer 342. The chip select signal FPCS and the like are generated by a CS generator 324. The read data signal from the device connected to the interface bus is transferred to the link controller 100 through the multiplexer 342 and the MPU interface circuit 320.

The information on the serial interface signal (serial data) received from the link controller 100 is input to the serial interface circuit 330. The serial interface signals such as the read signal, the data signal, the address 0 signal, and the write/clock signal are generated by a signal generator 332, and output as the signals FPA0, FPR/W, FPSIO, and FPSCK through the multiplexers 344 and 342. An I2C interface circuit 334 generates and outputs an I2C interface signal. SERIAL bus signals (through) from the host are output to the interface bus as the signals FPA0, FPR/W, FPSIO, and FPSCK through the multiplexers 344 and 342.

The target register information (interface information and timing information) from the link controller 100 is transferred to and written into the internal register 350 through the internal register interface circuit 340.

As shown in FIG. 15, the target-side interface circuit 110 includes the multiplexer 342 (344) which is connected with the outputs from the RGB interface circuit 310, the MPU interface circuit 320, and the serial interface circuit 330 (first to N-th interface circuits in a broad sense) at its input and is connected with the interface bus at its output. The multiplexer 342 selects the output from one of the RGB interface circuit 310, the MPU interface circuit 320, and the serial interface circuit 330, and outputs the interface signals generated by the selected interface circuit to the interface bus. In this case, the output from one of the interface circuits 310, 320, and 330 may be selected using the port number set in the packet, for example.

10. Configuration Example of MPU Interface Circuit

Figure 16:
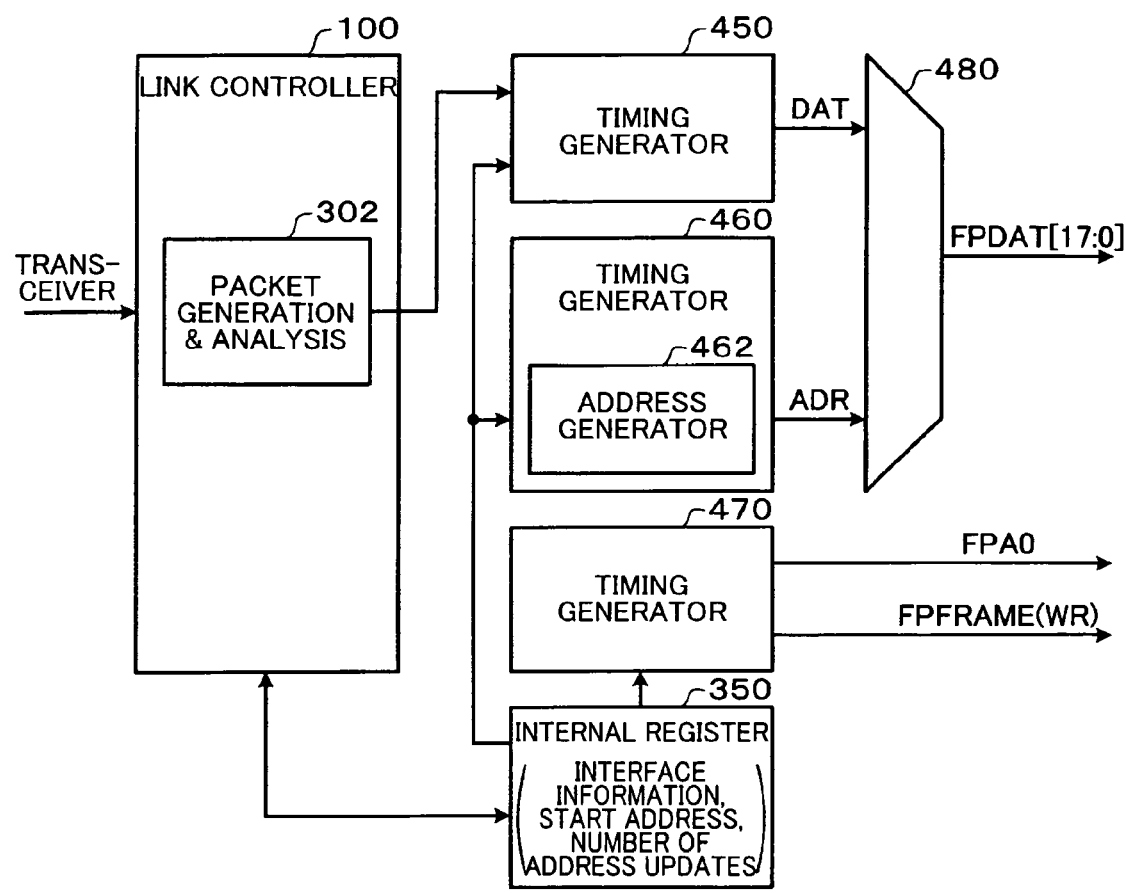
FIG. 16 is a configuration example of an MPU interface circuit.

A configuration example of the target-side MPU interface circuit 320 (signal generator 322) shown in FIG. 15 is described below using FIG. 16. As shown in FIG. 16, the MPU interface circuit 320 includes timing generators 450, 460, and 470 and a multiplexer 480.

The timing generator 450 receives the data information from the link controller 100, and receives the interface information from the internal register 350. The timing generator 450 outputs a data signal DAT in a signal type according to the interface information.

The timing generator 460 includes an address generator 462. The address generator 462 receives the start address and the number of address updates from the internal register 350, and automatically generates an address by performing the address automatic update processing as shown in the FIGS. 3A and 3B. The timing generator 460 receives the interface information from the internal register 350. The timing generator 460 outputs the address automatically generated by the address generator 462 as an address signal ADR in a signal type according to the interface information.

The timing generator 470 receives the interface information from the internal register 350. The timing generator 470 outputs an address 0 signal FPA0 and a write signal FPFRAME in a signal type according to the interface information.

The multiplexer 480 receives the data signal DAT from the timing generator 450 and the address signal ADR from the timing generator 460. The multiplexer 480 alternately selects the data signal DAT and the address signal ADR, multiplexes the data signal DAT and the address signal ADR into a signal FPDAT[17:0], and outputs the multiplexed signal. This enables the address signal and the data signal to be output in the output type as indicated by D2 shown in FIG. 3A.

11. Electronic Instrument

Figure 17:
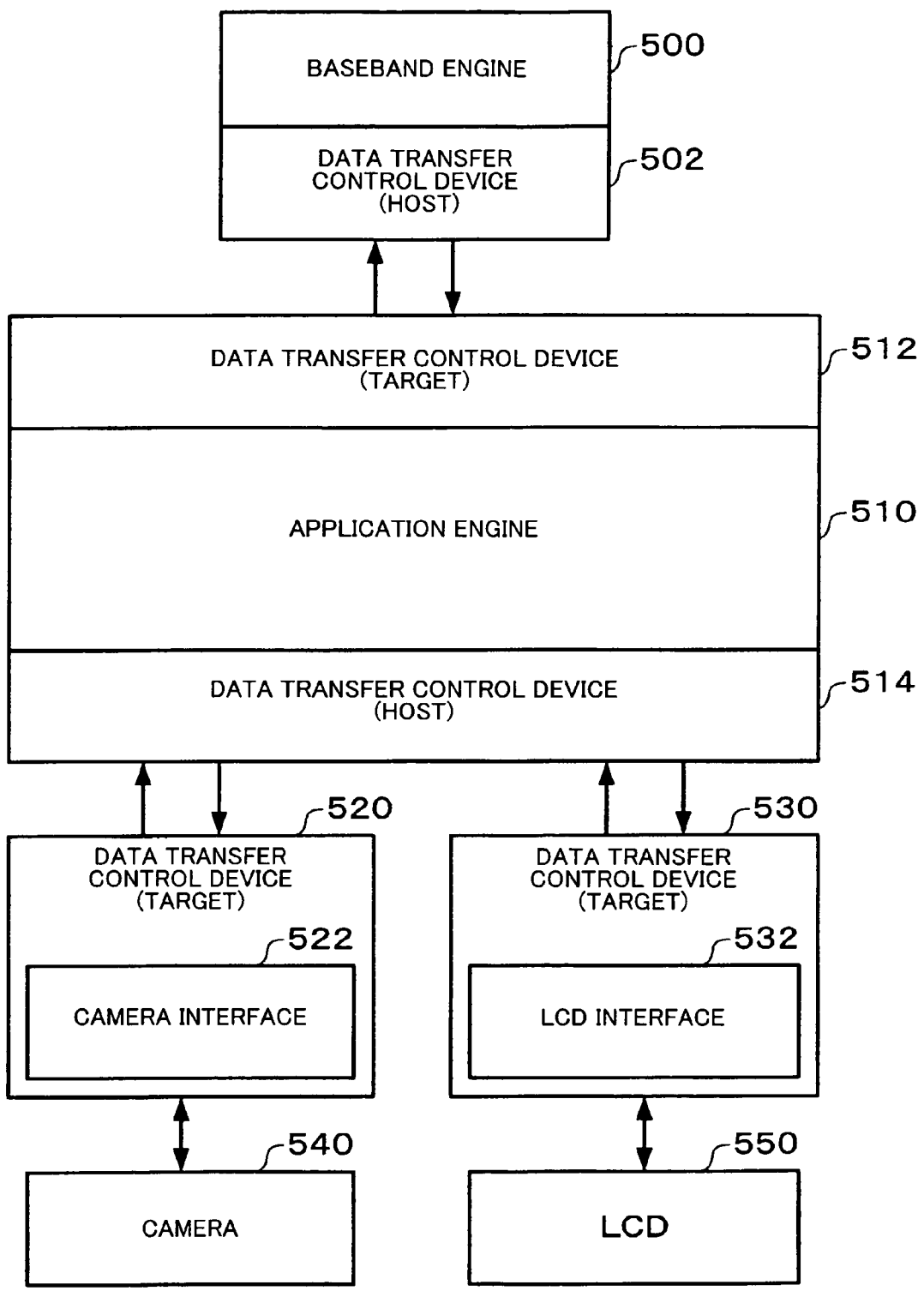
FIG. 17 is a configuration example of an electronic instrument.

FIG. 17 shows a configuration example of an electronic instrument in this embodiment. The electronic instrument includes data transfer control devices 502, 512, 514, 520, and 530 described in this embodiment. The electronic instrument includes a baseband engine 500 (communication device in a broad sense), an application engine 510 (processor in a broad sense), a camera 540 (imaging device in a broad sense), and an LCD 550 (display device in a broad sense). In other words, the electronic instrument shown in FIG. 17 includes the target-side data transfer control devices 520 and 530, the host-side data transfer control device 514 connected with the target-side data transfer control devices 520 and 530 through a serial bus, and one or more devices 540 and 550 connected with the target-side data transfer control devices 520 and 530 through an interface bus. The electronic instrument may have a configuration in which some of these blocks are omitted. According to this configuration, a portable telephone or the like having a camera function and a display function of a liquid crystal display (LCD) can be realized. However, the electronic instrument in this embodiment is not limited to the portable telephone, and may be applied to various electronic instruments such as a digital camera, PDA, electronic notebook, electronic dictionary, or portable information terminal.

As shown in FIG. 17, the serial transfer described in this embodiment is performed between the host-side data transfer control device 502 provided to the baseband engine 500 and the target-side data transfer control device 512 provided to the application engine 510 (graphic engine). The serial transfer described in this embodiment is also performed between the host-side data transfer control device 514 provided to the application engine 510 and the data transfer control device 520 including a camera interface circuit 522 or the data transfer control device 530 including an LCD interface circuit 532.

According to the configuration shown in FIG. 17, EMI noise can be reduced in comparison with a conventional electronic instrument. Moreover, power consumption of the electronic instrument can be further reduced by realizing a reduction of the scale and power consumption of the data transfer control device. In the case where the electronic instrument is a portable telephone, a serial signal line can be used as a signal line which passes through a connection section (hinge section) of the portable telephone, whereby mounting can be facilitated.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention. Any term (such as LCD1, LCD2 and GD, RGB, MPU and serial interface circuits, timing information) cited with a different term having broader or the same meaning (such as one or more devices, first to N-th interface circuits, interface information) at least once in this specification and drawings can be replaced by the different term in any place in this specification and drawings.

The configurations and the operations of the data transfer control device and the electronic instrument are not limited to the configurations and the operations described in this embodiment. Various modifications and variations may be made. For example, this embodiment describes the case where the interface circuit includes the RGB interface circuit, the MPU interface circuit, and the serial interface circuit. However, the interface circuit may be configured to not include the RGB interface circuit or the serial interface circuit. A configuration in which a part or the entirety of the target-side data transfer control device is incorporated into the device (LCD1, LCD2, or the like) connected to the interface bus may be employed. A configuration in which a part or the entirety of the host-side data transfer control device is incorporated into the system device may also be employed.

What is claimed is:

1. A data transfer control device that controls data transfer, the data transfer control device comprising:
    a link controller that analyzes a packet received from a host-side data transfer control device through a serial bus; and
    an interface circuit that generates an interface signal and outputs the interface signal to an interface bus,
    the data transfer control device being a target-side data transfer control device,
    the packet received from the host-side data transfer control device including an address automatic update field an address field, and a data field,
    the interface circuit performing address automatic update processing M times to generate a first automatically updated address to a (M)th automatically updated address by increment or decrement of a start address in the case that the address automatic update field indicates that an address automatic update mode is set to ON, the address field includes the start address and the data field includes K bits of data, K=L×(M+1), and K, L, and M are integers of two or more, and
    the interface signal including the start address and the first automatically updated address to the (M)th automatically updated address as well as a first L-bit-data to an (M+1)th L-bit-data of the K bits of data, and the start address and the first automatically updated address to the (M)th automatically updated address respectively corresponding to the first L-bit-data to the (M+1)th L-bit-data of the K bits of data.

2. The target-side data transfer control device as defined in claim 1,
    the packet transferred from the host-side data transfer control device through the serial bus including a number-of-updates field in which number-of-address-updates information is set, and
    the interface circuit performing address update processing a number of times set by the number-of-updates information set in the packet.

3. An electronic instrument, comprising:
    the target-side data transfer control device as defined in claim 2
    the host-side data transfer control device connected with the target-side data transfer control device through the serial bus; and
    one or more devices connected with the target-side data transfer control device through the interface bus.

4. The target-side data transfer control device as defined in claim 1,
    the packet transferred from the host-side data transfer control device through the serial bus including a port number field for setting a port number, and
    the interface circuit sequentially outputting signals of automatically updated addresses and signals of data that make pairs with the automatically updated addresses to a port selected from among ports of one or more devices connected to the interface bus and a port of an internal register of the target-side data transfer control device, based on the port number set in the packet as a destination.

5. An electronic instrument, comprising:
    the target-side data transfer control device as defined in claim 4;
    the host-side data transfer control device connected with the target-side data transfer control device through the serial bus; and
    one or more devices connected with the target-side data transfer control device through the interface bus.

6. The target-side data transfer control device as defined in claim 1, comprising:
    an internal register in which interface information for specifying a signal type of an interface signal output from the interface circuit is set,
    the interface circuit outputting signals of automatically updated addresses and signals of data that makes pairs with the automatically updated addresses as interface signals in a signal type according to the interface information set in the internal register.

7. The target-side data transfer control device as defined in claim 6,
    the interface information being set in the internal register based on a packet transferred from the host-side data transfer control device through the serial bus.

8. The target-side data transfer control device as defined in claim 7,
    a packet in which data is set in a data field being transferred from the host-side data transfer control device through the serial bus after the interface information has been set in the internal register, and
    the interface circuit outputting signals of automatically updated addresses and signals of data included in the data set in the packet as interface signals in a signal type according to the interface information set in the internal register.

9. An electronic instrument, comprising:
    the target-side data transfer control device as defined in claim 7;
    the host-side data transfer control device connected with the target-side data transfer control device through the serial bus; and
    one or more devices connected with the target-side data transfer control device through the interface bus.

10. An electronic instrument, comprising:
    the target-side data transfer control device as defined in claim 6;
    the host-side data transfer control device connected with the target-side data transfer control device through the serial bus; and
    one or more devices connected with the target-side data transfer control device through the interface bus.

11. An electronic instrument, comprising:
    the target-side data transfer control device as defined in claim 1;
    the host-side data transfer control device connected with the target-side data transfer control device through the serial bus; and
    one or more devices connected with the target-side data transfer control device through the interface bus.

12. A data transfer control device that controls data transfer, the data transfer control device comprising:
    an interface circuit that performs interface processing between the data transfer control device and a system device;

a link controller that generates a packet transmitted to a target-side data transfer control device through a serial bus; and an internal register accessed by the system device through the interface circuit, the data transfer control device being a host-side data transfer control device, the packet transferred to the target-side data transfer control device through the serial bus including an address automatic update field, an address field and a data at least a start address and K bits of data being set in the internal register by the system device, and the link controller setting the address automatic update field to indicate ON, setting the address field to include the start address and setting the data field to include the K bits of data in the case that the link controller has judged that a transfer mode is an address automatic update mode, and the address automatic update field instructing the target-side data transfer control device to generate a first automatically updated address to a (M)th automatically updated address by increment or decrement of the start address in the case that the address automatic update field indicates that the address automatic update mode is set to ON.

13. The host-side data transfer control device as defined in claim 12, the packet transferred to the target-side data transfer control device through the serial bus including a number-of-updates field in which number-of-address-updates information is set, and when the link controller has judged that the transfer mode is the address automatic update mode, the link controller generates a packet in which the address automatic update mode in the address automatic update field is set to ON, the number-of-updates information is set in the number-of-updates field, the start address is set in the address field, and the K bits of data are set in the data field, and transmits the generated packet to the target-side data transfer control device.

14. An electronic instrument, comprising:
the host-side data transfer control device as defined in claim 13;
the target-side data transfer control device connected with the host-side data transfer control device through the serial bus; and
one or more devices connected with the target-side data transfer control device through the interface bus.

15. The host-side data transfer control device as defined in claim 12, interface information for specifying a signal type of an interface signal output from an interface circuit of the target-side data transfer control device being set in the internal register by the system device, and the link controller generating a packet including the interface information set in the internal register, and transmitting the generated packet to the target-side data transfer control device through the serial bus.

16. The host-side data transfer control device as defined in claim 15, the internal register including a register transfer start register, and the link controller generating a packet including the interface information set in the internal register when the system device has directed start of transfer using the register transfer start register, and transmitting the generated packet to the target-side data transfer control device through the serial bus.

17. An electronic instrument, comprising:
the host-side data transfer control device as defined in claim 16;
the target-side data transfer control device connected with the host-side data transfer control device through the serial bus; and
one or more devices connected with the target-side data transfer control device through the interface bus.

18. The host-side data transfer control device as defined in claim 15, the link controller generating a packet in which data is set in a data field and transmitting the generated packet to the target-side data transfer control device through the serial bus after transmitting a packet including the interface information to the target-side data transfer control device.

19. An electronic instrument, comprising:
the host-side data transfer control device as defined in claim 15;
the target-side data transfer control device connected with the host-side data transfer control device through the serial bus; and
one or more devices connected with the target-side data transfer control device through the interface bus.

20. An electronic instrument, comprising:
the host-side data transfer control device as defined in claim 12;
the target-side data transfer control device connected with the host-side data transfer control device through the serial bus; and
one or more devices connected with the target-side data transfer control device through the interface bus.

* * * * *